(12) United States Patent
Henderson

(10) Patent No.: US 8,597,015 B2
(45) Date of Patent: Dec. 3, 2013

(54) AIRFOIL MANUFACTURING SYSTEM

(75) Inventor: Raymond Neil Henderson, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/968,473

(22) Filed: Dec. 15, 2010

(65) Prior Publication Data

US 2012/0153539 A1 Jun. 21, 2012

(51) Int. Cl.
*B29C 70/30* (2006.01)
*B29C 70/40* (2006.01)
*B29C 53/04* (2006.01)
*B29C 53/80* (2006.01)

(52) U.S. Cl.
USPC ........ 425/397; 425/126.1; 425/389; 425/394; 425/400; 425/508; 264/544

(58) Field of Classification Search
CPC ...... B29C 70/30; B29C 70/38; B29C 70/342; B29C 70/382; B29C 70/384; B29C 70/541
USPC ......... 425/356, 384, 388, 389, 397, 398, 400, 425/403, 403.1, 412, 451.9, 423, 112, 121, 425/125, 126.1, 501, 508, 394; 264/544, 264/545
See application file for complete search history.

(56) References Cited

U.S. PATENT DOCUMENTS

| | | | |
|---|---|---|---|
| 4,475,976 A * | 10/1984 | Mittelstadt et al. | 156/286 |
| 4,946,551 A * | 8/1990 | Ishige et al. | 156/222 |
| 4,980,013 A * | 12/1990 | Lowery | 156/443 |
| 5,139,604 A * | 8/1992 | Mitchell | 156/479 |
| 5,464,341 A * | 11/1995 | Tachibana et al. | 425/388 |
| 5,648,109 A * | 7/1997 | Gutowski et al. | 425/504 |
| 5,954,917 A * | 9/1999 | Jackson et al. | 156/433 |
| 6,495,086 B1 * | 12/2002 | Uytterhaeghe et al. | 264/322 |
| 6,814,916 B2 | 11/2004 | Willden et al. | |
| 6,893,247 B2 * | 5/2005 | Uytterhaeghe et al. | 425/397 |
| 7,118,370 B2 | 10/2006 | Willden et al. | |
| 7,527,759 B2 * | 5/2009 | Lee et al. | 264/319 |

(Continued)

FOREIGN PATENT DOCUMENTS

WO W09846419 A1 10/1998
WO W02004078443 A1 9/2004

OTHER PUBLICATIONS

LM Wind Power—1 page, retrieved Nov. 5, 2010 http://www.lmwindpower.com/.
Wind Power Technologies Online Abstracts and Reports Topic Selection, pp. 1-2, retrieved Nov. 5, 2010 http://windpower.sandia.gov/TopicSelection.htm.
"Wind turbine blades: Big and getting bigger", Composites Technology, Jun. 1, 2008, pp. 1-9 http://www.compositesworld.com/articles/wind-turbine-blades-big-and-getting-bigger.aspx.
Ong et al., "The Use of Carbon Fibers in Wind Turbine Blade Design: a SERI-9 blade example", SAND2000-0478, Mar. 2000, Sandia National Laboratories, Albuquerque, NM, pp. 1-79.
Cairns, "Resin Transfer Molding and Wind Turbine Blade Construction, a Final Research Report", SAN99-3047, Jan. 2000, Sandia National Laboratories, Albuquerque NM, pp. 1-31.

(Continued)

*Primary Examiner* — Seyed Masoud Malekzadeh
(74) *Attorney, Agent, or Firm* — Yee & Associates, P.C.

(57) ABSTRACT

An apparatus and method for shaping an airfoil. A prepreg assembly is positioned relative to a part in a plurality of parts for a tool for the airfoil using a positioning section for a frame. The positioning section is configured to move relative to the tool and a base of the frame and move a number of parts in the plurality of parts for the tool relative to each other. A number of sections in the prepreg assembly are heated. A force is applied to the number of sections in the prepreg assembly that have been heated to conform to the tool to cause the number of sections in the prepreg assembly that have been heated to conform to the tool with a shape for a component of the airfoil.

17 Claims, 18 Drawing Sheets

(56) References Cited

U.S. PATENT DOCUMENTS

| | | | |
|---|---|---|---|
| 7,651,650 B2* | 1/2010 | Willden et al. | 264/258 |
| 7,708,546 B2* | 5/2010 | Lee et al. | 425/423 |
| 8,118,959 B2* | 2/2012 | Nelson et al. | 156/220 |
| 2005/0086991 A1* | 4/2005 | Barnett | 72/319 |
| 2006/0291991 A1* | 12/2006 | Willden et al. | 414/806 |
| 2010/0043941 A1* | 2/2010 | Henderson et al. | 156/64 |

OTHER PUBLICATIONS

Cairns et al., "Evaluation of Hand Lay-Up and Resin Transfer Molding in Composite Wind Turbine Blade Manufacturing", SAN2000-1425, Jun. 2000, Sandia National Laboratories, Albuquerque NM, pp. 1-243.

Extended European Search Report, dated Oct. 1, 2013, regarding Application No. EP11186898.0, 6 pages.

* cited by examiner

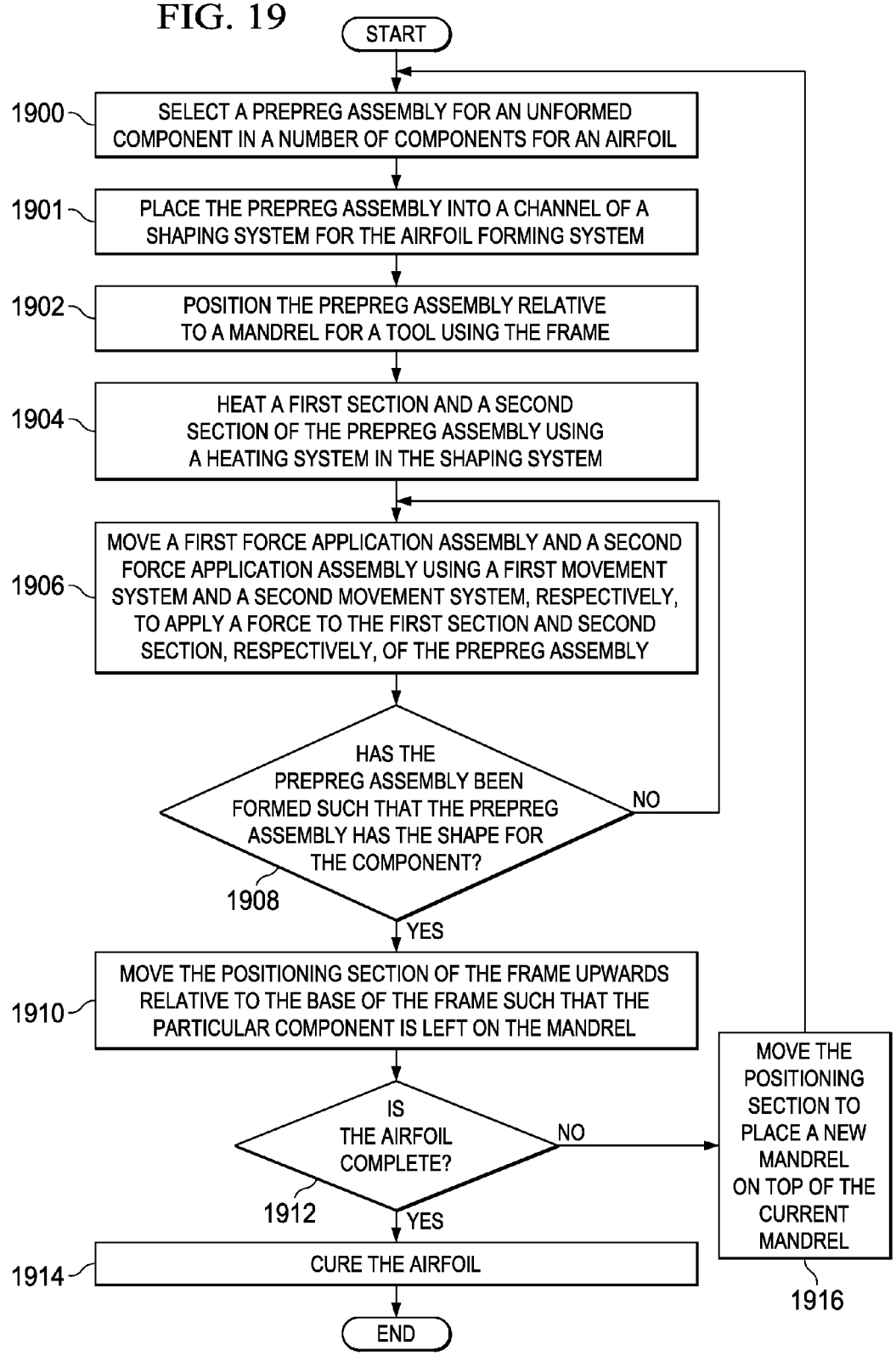

AIRFOIL MANUFACTURING SYSTEM

BACKGROUND INFORMATION

1. Field:

The present disclosure relates generally to manufacturing composite structures and, in particular, to manufacturing airfoils using composite materials. Still more particularly, the present disclosure relates to a method and apparatus for manufacturing composite wind turbines or aircraft airfoils.

2. Background:

A wind farm is a type of power plant that produces electrical power from the wind. A wind farm may have from a few dozen to several hundred wind turbines. Wind turbines in a wind farm may cover hundreds of square miles.

A wind turbine is a rotary device configured to generate energy using the wind. A wind turbine generates mechanical energy in response to the movement of wind. This mechanical energy may be turned into electricity. A wind turbine comprises blades that are rotatably mounted to a structure. An electrical generator may be used to generate electricity from movement of the blades.

Wind turbines used in wind farms typically have three blades and are pointed into the wind through computer controlled motors. These wind turbine blade tips may have speeds over about 200 miles per hour. The blades in a wind turbine may rotate at about 10 to about 22 revolutions per minute.

The blades in a wind turbine are airfoils with shapes that are similar to those for aircraft wings. Traditionally, a blade for a wind turbine has two curved surfaces or shells. These surfaces are joined at a leading edge and a trailing edge. Additionally, the blades may have a number of structural spars inside. Manufacturing blades for wind turbines using composite materials is labor intensive and expensive.

A blade for a large wind turbine may be from about 13 meters to about 60 meters in length. As the length of the blades increase, deflection becomes more of an issue. Deflection is a change in the shape of the blade. As a result, as the length of the blades increase, the strength of the blades also increases to reduce deflection.

These blades may be made from various materials such as fiberglass, carbon, wood, and/or other materials. In manufacturing a blade, a gel coat is typically placed on the surface of a mold for the shell. Thereafter, glass fiber layers and other parts may be placed onto the surface inside of the mold. A film may then be placed over this assembly of materials. A resin is then infused into the glass fiber materials under pressure or with vacuum assistance. Depending on the size of the blade, resin is injected into the mold from multiple locations.

Managing the flow of resin to obtain a uniform infusion of resin throughout the blade is often difficult. Inconsistencies in the resin may result in having to rework the blade or discard the blade. Having to rework the blade or discard the blade increases the cost and time needed to manufacture blades for wind turbines.

Therefore, it would be advantageous to have a method and apparatus that takes into account at least some of the issues discussed above as well as possibly other issues.

SUMMARY

In one advantageous embodiment, an apparatus comprises a frame and a shaping system. The frame is configured to position a prepreg assembly relative to a tool having a plurality of parts. The frame comprises a base and a positioning section. The positioning section is configured to move relative to the tool and the base of the frame and move a part in the plurality of parts relative to other parts in the plurality of parts during shaping on the prepreg assembly. The shaping system is associated with the frame and is configured to move relative to the prepreg assembly positioned relative to a number of parts in the plurality of parts for the tool connected to the base to change a first shape of the prepreg assembly to form a second shape for an airfoil when the positioning section moves relative to the tool.

In another advantageous embodiment, an airfoil forming system comprises a frame and a shaping system. The frame has a base and a positioning section. The positioning section has a first channel and is configured to position a prepreg assembly in the first channel relative to a tool comprising a plurality of parts. The positioning section is configured to move relative to the tool and the base of the frame and move a part in the plurality of parts relative to other parts in the plurality of parts. The shaping system comprises a heating system, a force application system, and a second channel. The heating system is associated with the positioning section and is configured to heat a number of sections in the prepreg assembly to form a number of heated sections in the prepreg assembly. The force application system is associated with the positioning section and is configured to apply a force to the number of heated sections in the prepreg assembly relative to the tool such that the number of heated sections in the prepreg assembly has a second shape for the airfoil.

In yet another advantageous embodiment, a method is provided for shaping an airfoil. A prepreg assembly is positioned relative to a part in a plurality of parts for a tool for the airfoil using a positioning section for a frame. The positioning section is configured to move relative to the tool and a base of the frame and move a number of parts in the plurality of parts for the tool relative to each other. A number of sections in the prepreg assembly are heated. A force is applied to the number of sections in the prepreg assembly that have been heated to conform to the tool to cause the number of sections in the prepreg assembly that have been heated to conform to the tool with a shape for a component of the airfoil.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 19 is an illustration of a flowchart of a process for shaping an airfoil in accordance with an advantageous embodiment.

DETAILED DESCRIPTION

Figure 1:
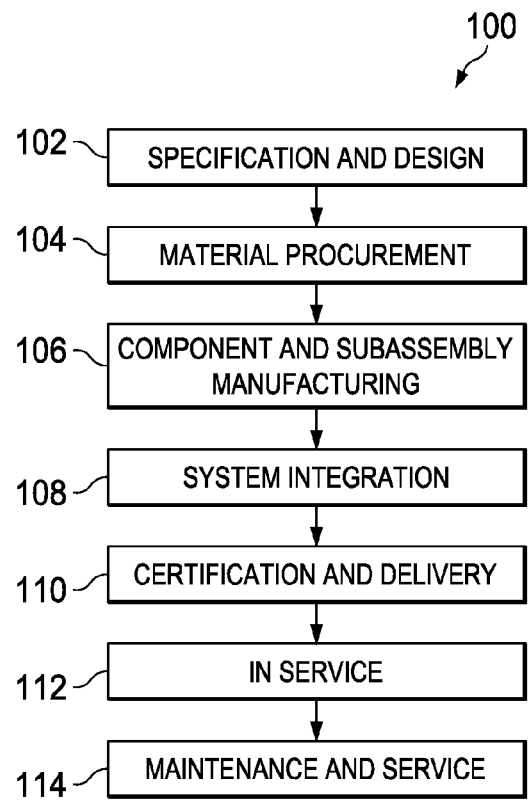
FIG. 1 is an illustration of a wind turbine manufacturing and service method in accordance with an advantageous embodiment.
Figure 2:
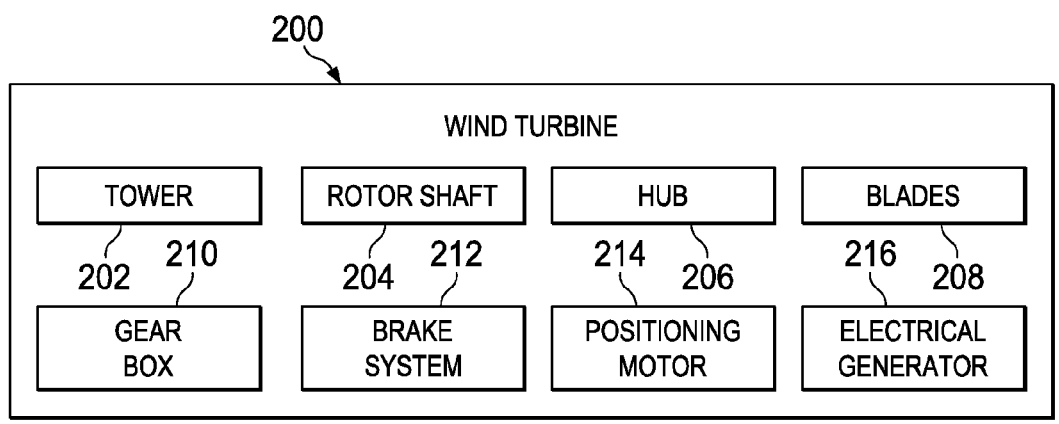
FIG. 2 is an illustration of a wind turbine in which an advantageous embodiment may be implemented.

Referring more particularly to the drawings, embodiments of the disclosure may be described in the context of wind turbine manufacturing and service method 100 as shown in FIG. 1 and wind turbine 200 as shown in FIG. 2. Turning first to FIG. 1, an illustration of a wind turbine manufacturing and service method is depicted in accordance with an advantageous embodiment. During pre-production, wind turbine manufacturing and service method 100 may include specification and design 102 of wind turbine 200 in FIG. 2 and material procurement 104.

During production, component and subassembly manufacturing 106 and system integration 108 of wind turbine 200 in FIG. 2 takes place. Thereafter, wind turbine 200 in FIG. 2 may go through certification and delivery 110 in order to be placed in service 112. While in service 112 by a customer, wind turbine 200 in FIG. 2 is scheduled for routine maintenance and service 114, which may include modification, reconfiguration, refurbishment, and other maintenance or service.

Each of the processes of wind turbine manufacturing and service method 100 may be performed or carried out by a system integrator, a third party, and/or an operator. In these examples, the operator may be a customer. For the purposes of this description, a system integrator may include, without limitation, any number of wind turbine manufacturers and major system subcontractors; a third party may include, without limitation, any number of vendors, subcontractors, and suppliers; and an operator may be a power company, leasing company, government entity, service organization, and so on.

With reference now to FIG. 2, an illustration of a wind turbine is depicted in which an advantageous embodiment may be implemented. In this example, wind turbine 200 is produced by wind turbine manufacturing and service method 100 in FIG. 1 and may include tower 202, rotor shaft 204, hub 206, blades 208, gear box 210, brake system 212, positioning motor 214, and electrical generator 216.

Any number of other components may be included depending on the implementation. Although a wind turbine example is shown, different advantageous embodiments may be applied to other industries in which airfoils are used. One illustrative example is the aircraft industry.

Tower 202 is a structure that supports the other components in wind turbine 200. For example, tower 202 supports rotor shaft 204, hub 206, blades 208, gear box 210, brake system 212, positioning motor 214, and electrical generator 216. Blades 208 are connected to hub 206. In turn, hub 206 is connected to rotor shaft 204. Blades 208 cause rotor shaft 204 to rotate when wind is present.

As used herein, a first component connected to a second component means that the first component can be connected directly or indirectly to the second component. In other words, additional components may be present between the first component and the second component. When the first component is directly connected to the second component, no additional components are present between the two components.

Electrical generator 216 generates electricity in response to rotation of rotor shaft 204. Gear box 210 may be used to increase rotational speed of blades 208 to match the speed required by the generator. Brake system 212 may be used to slow and/or stop the rotation of rotor shaft 204.

Apparatuses and methods embodied herein may be employed during at least one of the stages of wind turbine manufacturing and service method 100 in FIG. 1. As used herein, the phrase "at least one of", when used with a list of items, means that different combinations of one or more of the listed items may be used, and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while wind turbine 200 is in service 112 in FIG. 1.

As yet another example, a number of apparatus embodiments, method embodiments, or a combination thereof may be utilized during production stages, such as component and subassembly manufacturing 106 and system integration 108 in FIG. 1. A number, when referring to items, means one or more items. For example, a number of apparatus embodiments is one or more apparatus embodiments.

A number of apparatus embodiments, method embodiments, or a combination thereof may be utilized while wind turbine 200 is in service 112 and/or during maintenance and service 114 in FIG. 1. The use of a number of the different advantageous embodiments may substantially expedite the assembly of, and/or reduce the cost of, wind turbine 200.

The different advantageous embodiments recognize and take into account a number of different considerations. A number, as used herein, with reference to items, means one or more items. For example, "a number of considerations" is one or more considerations. For example, the different advantageous embodiments recognize and take into account that a wind turbine blade typically includes two curved surfaces made from fabric comprising glass fibers infused with a liquid resin. These surfaces are also referred to as shells. The shells are joined at a leading and trailing edge of the airfoil. Additionally, a number of structural components may be present between the shells. For example, one or two spars may be present inside of the blade.

The different advantageous embodiments recognize and take into account that managing resin flow may be difficult using currently available manufacturing techniques for blades used in wind turbines. The different advantageous embodiments recognize and take into account that obtaining an even amount of resin throughout the blade may be difficult. Inconsistent levels of resins may result in inconsistencies that may require reworking or discarding a blade. For example, these inconsistencies may include voids. A void is a portion of the blade without the resin.

The different advantageous embodiments recognize and take into account that one solution may involve using a prepreg carbon fiber composite instead of a vacuum-assisted resin transfer process. In other words, fibers with resin already impregnated into the fibers may be used. These materials may be referred to as prepreg assemblies. These prepreg assemblies may be laid up to make the different components. The different components may then be assembled to finish the blade. The different advantageous embodiments recognize and take into account that issues involved with infusing resin may be avoided by using a prepreg carbon fiber composite. For example, wrinkles may be reduced and/or avoided by using a prepreg carbon fiber composite.

Further, the different advantageous embodiments recognize and take into account that having an airfoil formed from carbon fiber composites in which wrinkles are substantially absent gives the airfoil an increased strength and reduced weight, as compared to airfoils formed from resin-infused glass fibers.

The different advantageous embodiments recognize and take into account that using a prepreg assembly may reduce inconsistencies, but the time to manufacture a blade may not be reduced as much as desired. For example, the different advantageous embodiments recognize and take into account that prepreg assemblies of composite material may be used by laying the material in a mold. The different advantageous embodiments recognize and take into account that the mold is typically an interline mold. In other words, the prepreg assemblies are placed inside of the mold.

The different advantageous embodiments recognize and take into account that the prepreg assemblies may be laid by hand or a computer numerical controlled (CNC) machine. The different advantageous embodiments recognize and take into account that laying up prepreg assemblies by hand may be time-consuming and may be subject to errors. Further, the different advantageous embodiments recognize and take into account that using a computer numerical controlled machine to lay prepreg assemblies into molds for new parts may require a five-axis program for each shell and each design that is more complex than desired. Additionally, the different advantageous embodiments recognize and take into account that this type of process may still require assembly of individual parts to finish the blade.

The different advantageous embodiments recognize and take into account that forming the different components for an airfoil during the same forming process may reduce the time, effort, and/or cost for forming the airfoil, as compared to currently available processes that form each component for the airfoil independently of the other components.

Thus, the different advantageous embodiments provide a method and apparatus for forming airfoils. In one advantageous embodiment, an apparatus comprises a frame and a forming system. The frame is configured to hold a prepreg assembly relative to a tool. The forming system is associated with the frame and configured to move the prepreg assembly relative to the tool to change a first shape of the prepreg assembly to form a second shape for a wrinkle-free airfoil.

Figure 3:
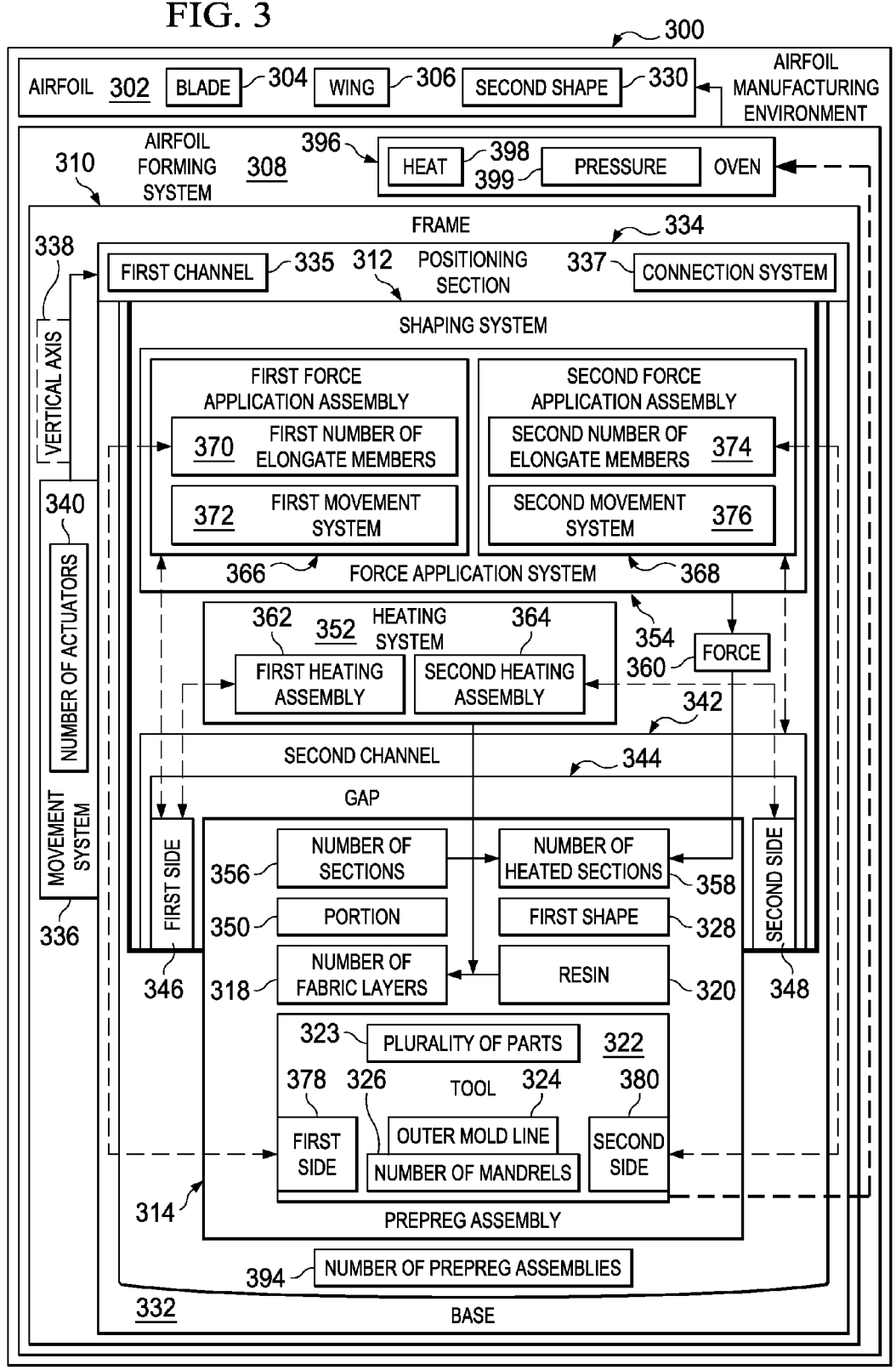
FIG. 3 is an illustration of an airfoil manufacturing environment in accordance with an advantageous embodiment.

With reference now to FIG. 3, an illustration of an airfoil manufacturing environment is depicted in accordance with an advantageous embodiment. In this example, airfoil manufacturing environment 300 may be used to manufacture airfoil 302. Airfoil 302 may be used in wind turbine 200 in FIG. 2. In particular, airfoil 302 may take the form of blade 304 and may be used in blades 208 in FIG. 2. Airfoil 302 may take other forms such as, for example, wing 306 for an aircraft.

In this illustrative example, airfoil 302 is manufactured using airfoil forming system 308. Airfoil forming system 308 comprises frame 310 and shaping system 312. Frame 310 is configured to position prepreg assembly 314 within airfoil forming system 308. Prepreg assembly 314 also may be referred to as a charge. A prepreg assembly is comprised of a number of prepreg layers of material.

In these illustrative examples, prepreg assembly 314 comprises number of fabric layers 318 with resin 320. Number of fabric layers 318 has different orientations depending on the particular implementation.

In the depicted examples, number of fabric layers 318 may be comprised of a number of different materials. For example, number of fabric layers 318 may be comprised of carbon fibers, metal fibers, glass-reinforced plastic, carbon fiber-reinforced plastic, and/or other suitable types of materials. Number of fabric layers 318 takes different forms. For example, number of fabric layers 318 may be unidirectional tapes of different widths, a plane weave, fibers braided together, fibers stitched together, and/or some other suitable form. These fabric layers may also be referred to as plies.

In these examples, resin 320 is impregnated or infused into number of fabric layers 318 to form prepreg assembly 314. Resin 320 may take different forms. For example, without limitation, resin 320 may be an epoxy, a shape memory polymer, and/or other some suitable types of material.

In these illustrative examples, prepreg assembly 314 may be positioned relative to tool 322 using frame 310. Tool 322 may take a number of different forms. For example, tool 322 may be outer mold line 324, number of mandrels 326, and/or other suitable types of tools. Outer mold line 324 is a mold on which prepreg assembly 314 is placed on the outer surface of outer mold line 324. Outer mold line 324 also may have more than one piece depending on the particular implementation. In particular, tool 322 is a multipart tool comprising plurality of parts 323. As one illustrative example, each part in plurality of parts 323 may be a mandrel.

In the illustrative examples, frame 310 may have base 332, positioning section 334, and movement system 336. Positioning section 334 holds prepreg assembly 314 in these examples. Positioning section 334 may move relative to base 332. Further, positioning section 334 moves relative to tool 322.

In these depicted examples, positioning section 334 is configured to move a number of parts in plurality of parts 323 relative to other parts in plurality of parts 323. The other parts may be connected to base 332. Positioning section 334 includes first channel 335. First channel 335 is configured to receive a number of parts in plurality of parts 323.

For example, positioning section 334 may include connection system 337. Connection system 337 is configured to connect a number of parts in plurality of parts 323 to positioning section 334 in first channel 335. Positioning section 334 may move relative to base 332 and tool 322 such that the number of parts connected to positioning section 334 moves with positioning section 334 relative to the other parts in plurality of parts 323 for tool 322.

The number of parts in plurality of parts 323 not connected to positioning section 334, in these examples, are connected to base 332. The number of parts in plurality of parts 323 for tool 332 connected to base 332 includes the parts used to shape prepreg assembly 314. The number of parts in plurality of parts 323 connected to positioning section 334 includes the parts not currently being used to shape prepreg assembly 314. The number of parts in plurality of parts 323 held by positioning section 334 may be placed on or connected to the parts in plurality of parts 323 connected to base 332 for use in shaping prepreg assembly 314.

In these illustrative examples, movement system 336 controls positioning section 334. In other words, movement system 336 may move positioning section 334 along vertical axis 338. Of course, positioning section 334 may move along other axes, depending on the particular implementation. Positioning section 334 may move relative to vertical axis 338 to position prepreg assembly 314 relative to tool 322. Movement system 336 may take the form of number of actuators 340. Number of actuators 340 may be electromechanical actuators in these examples.

In this illustrative example, shaping system 312 is configured to move prepreg assembly 314 positioned relative to tool 322 in a manner that changes first shape 328 of prepreg assembly 314 to form a second shape 330 for airfoil 302.

First shape 328 is the original shape of prepreg assembly 314 before any changes in shape occur. Second shape 330 is the shape for a component in airfoil 302. Second shape 330 may be, for example, without limitation, a spar, a shell, and/or some other suitable shape. In some illustrative examples, second shape 330 may be the shape for the entire airfoil 302.

Second channel 342 is present in shaping system 312. Additionally, second channel 342 has gap 344. Gap 344 has first side 346 and second side 348. In these illustrative examples, prepreg assembly 314 is placed into gap 344 of second channel 342.

Portion 350 of prepreg assembly 314 within gap 344 of second channel 342 is exposed in these examples. Portion 350 may be shaped against tool 322 by shaping system 312 in these examples. In these illustrative examples, shaping system 312 comprises heating system 352 and force application system 354. Heating system 352 is configured to heat number of sections 356 of prepreg assembly 314 to form number of heated sections 358 of prepreg assembly 314.

In these illustrative examples, heating system 352 comprises first heating assembly 362 and second heating assembly 364. First heating assembly 362 is located on first side 346 of gap 344 in second channel 342. Second heating assembly 364 is located on second side 348 of gap 344 in second channel 342.

As depicted, these heating assemblies are configured to heat corresponding number of sections 356 located on either side of gap 344 in second channel 342. In these illustrative examples, number of sections 356 may be continuous and/or non-continuous sections. For example, a section in number of sections 356 may have subsections that are non-continuous. Portion 350 in gap 344 is number of heated sections 358 in these examples when number of sections 356 are heated by heating system 352.

Heating system 352 may heat number of heated sections 358 to a temperature sufficient to allow number of heated sections 358 to change from first shape 328 to second shape 330 for airfoil 302. The change in first shape 328 to second shape 330 may be performed by force application system 354. Force application system 354 is configured to apply force 360 to number of heated sections 358 relative to tool 322 such that number of heated sections 358 of prepreg assembly 314 has second shape 330 in these examples.

In these illustrative examples, number of heated sections 358 may, for example, without limitation, have a temperature of about 100 degrees Fahrenheit to about 130 degrees Fahrenheit. Of course, any temperature may be used that causes prepreg assembly 314 to be compliable or capable of being changed in shape by force application system 354.

As depicted, force application system 354 comprises first force application assembly 366 and second force application assembly 368. First force application assembly 366 is associated with frame 310 on first side 346 of gap 344. Second force application assembly 368 is associated with frame 310 on second side 348 of gap 344. First force application assembly 366 and second force application assembly 368 are configured to move to apply force 360 to number of heated sections 358 of prepreg assembly 314 such that number of heated sections 358 has second shape 330 for airfoil 302 in these illustrative examples.

In these illustrative examples, first force application assembly 366 comprises first number of elongate members 370 and first movement system 372. Second force application assembly 368 comprises second number of elongate members 374 and second movement system 376.

First movement system 372 is configured to move first number of elongate members 370 relative to tool 322 to apply force 360 to number of heated sections 358 of prepreg assembly 314. Second movement system 376 is configured to move second number of elongate members 374 relative to tool 322 to apply force 360 to number of heated sections 358 of prepreg assembly 314.

In these illustrative examples, first number of elongate members 370 may be positioned relative to first side 378 of tool 322, while second number of elongate members 374 may be positioned relative to second side 380 of tool 322. As a result, first number of elongate members 370 applies force 360 to number of heated sections 358 located on first side 378, while second number of elongate members 374 applies force 360 to number of heated sections 358 on second side 380 of tool 322.

First movement system 372 comprises a number of actuators. Second movement system 376 comprises a number of actuators. One or more of the number of actuators in first movement system 372 is configured to move a first portion of first number of elongate members 370 independently of a second portion of first number of elongate members 370. In a similar fashion, the number of actuators in second movement system 376 is configured to move a first portion of second number of elongate members 374 independently of a second portion of second number of elongate members 374.

With one or more of the advantageous embodiments, inconsistencies in airfoils may be reduced through the use of prepreg assemblies. Further, with one or more of the different advantageous embodiments, the expense and programming needed for computer numerical controlled machines may be avoided.

In the different illustrative examples, additional prepreg assemblies, in addition to prepreg assembly 314, may be used. For example, in some illustrative examples, airfoil 302 may be manufactured using number of prepreg assemblies 394 in addition to prepreg assembly 314. For example, prepreg assembly 314 may be a shell of airfoil 302, while number of prepreg assemblies 394 may form structural elements, such as a number of spars.

After prepreg assembly 314 and number of prepreg assemblies 394 have been moved relative to tool 322 such that prepreg assembly 314 and number of prepreg assemblies 394 have been changed from first shape 328 to second shape 330 for airfoil 302, prepreg assembly 314 and number of prepreg assemblies 394 may be moved along with tool 322 to oven 396 where heat 398 and/or pressure 399 are used to cure prepreg assembly 314 and number of prepreg assemblies 394 to complete the forming of airfoil 302. Thereafter, tool 322 may be removed from airfoil 302.

The illustration of airfoil manufacturing environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, positioning section 334 in frame 310 may move about other axes in addition to vertical axis 338. Further, in some illustrative examples, heating system 352 may be unnecessary.

With shaping system 312, a complicated three-dimensional program for different airfoils is not needed. An expensive five-axis computer numerical controlled tape laying machine is also not required. The prepreg assembly can be built using simple programs and less expensive three-axis tape laying machines. Further, shaping system 312 also reduces or avoids a need for human operators to place multiple individual prepreg plies onto tool 322.

Figure 4:
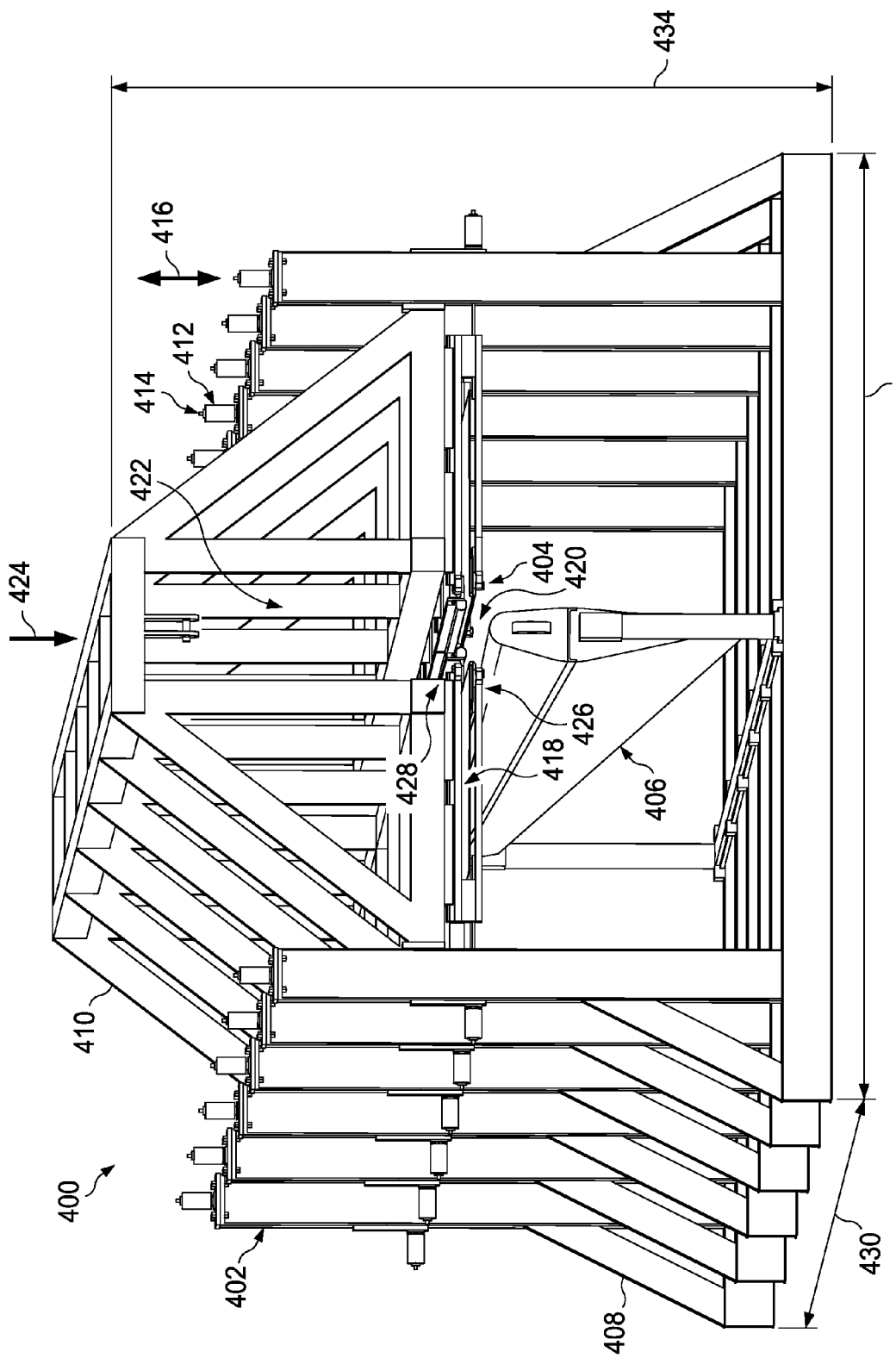
FIG. 4 is an illustration of an airfoil forming system in accordance with an advantageous embodiment.

With reference now to FIG. 4, an illustration of an airfoil forming system is depicted in accordance with an advantageous embodiment. Airfoil forming system 400 is an example of an implementation for shaping system 312 in FIG. 3. In this illustrative example, airfoil forming system 400 includes frame 402 and shaping system 404. In this illustrative example, airfoil forming system 400 comprises frame 402, shaping system 404, and tool 406. Tool 406 is a multipart tool in these illustrative examples. In particular, tool 406 comprises a plurality of mandrels.

Frame 402 comprises base 408, positioning section 410, and movement system 412. Movement system 412 comprises actuators 414. Movement system 412 is configured to move positioning section 410 relative to base 408 and to tool 406. Movement system 412 is configured to move positioning section 410 in the direction of axis 416.

In this illustrative example, channel 418 is present in shaping system 404. Gap 420 is present in channel 418. In these illustrative examples, tool 406 may move into gap 420 and then into channel 422 in positioning section 410. Channel 422 is perpendicular to channel 418 in these examples. Tool 406 may move into gap 420 in channel 418 and then into channel 422 when positioning section 410 is moved in the direction of arrow 424.

As depicted, shaping system 404 comprises heating system 426 and force application system 428. In this illustrative example, frame 402 may have depth 430, width 432, and height 434. Depth 430 may be about 55 feet, width 432 may be about 19 feet, and height 434 may be about 15 feet in this depicted example. Of course, the dimensions may vary, depending on the particular implementation.

In these illustrative examples, frame 402 may be comprised of materials, such as, for example, without limitation, steel, titanium, aluminum, and/or other suitable types of materials. Further, tool 406 may be comprised of materials, such as, for example, without limitation, a nickel steel alloy, a steel alloy, and/or other suitable types of materials.

Figure 5:
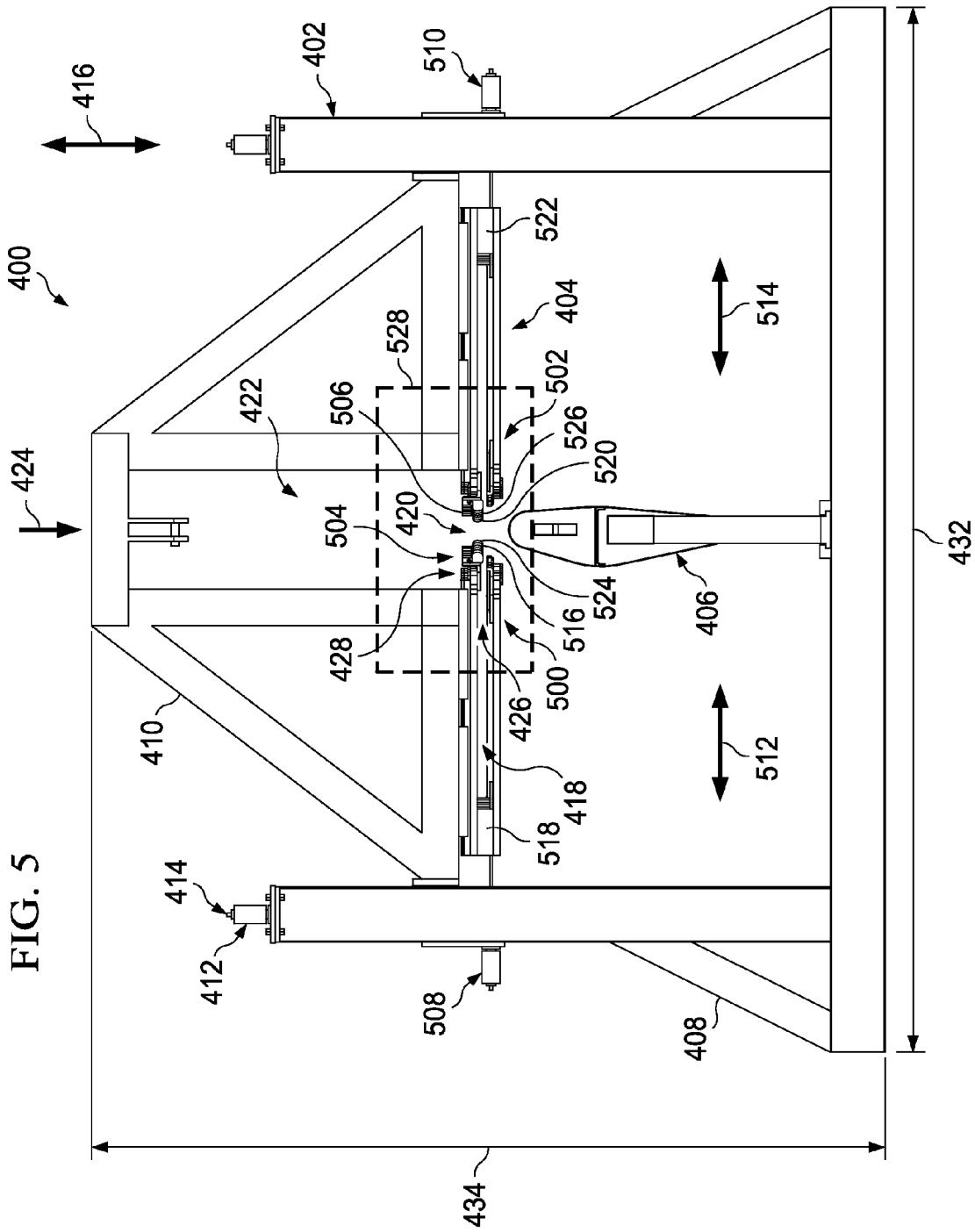
FIG. 5 is an illustration of a side view of an airfoil forming system in accordance with an advantageous embodiment.

With reference now to FIG. 5, an illustration of a side view of an airfoil forming system is depicted in accordance with an advantageous embodiment. In this side view of airfoil forming system 400, heating system 426 from FIG. 4 comprises first heating assembly 500 and second heating assembly 502. Force application system 428 comprises first force application assembly 504, second force application assembly 506, first movement system 508, and second movement system 510.

In this illustrative example, first movement system 508 may move first force application assembly 504 in the direction of arrow 512. Second movement system 510 may move second force application assembly 506 in the direction of arrow 514. First movement system 508 and second movement system 510 may comprise actuators. In this example, gap 420 may change as first movement system 508 and second movement system 510 move first force application assembly 504 and second force application assembly 506.

In this illustrative example, first force application assembly 504 and second force application assembly 506 are moveably associated with frame 402. In particular, first force application assembly 504 and second force application assembly 506 are moveably associated with positioning section 410. First heating assembly 500 and second heating assembly 502 are associated with positioning section 410 in frame 402 through first force application assembly 504 and second force application assembly 506. First heating assembly 500 and second heating assembly 502 apply a bending force to a prepreg assembly by heating the prepreg assembly.

As depicted, first force application assembly 504 comprises elongate member 516 and moveable beam 518. Second force application assembly 506 comprises elongate member 520 and moveable beam 522. Elongate member 516 and elongate member 520 take the form of bladder 524 and bladder 526, respectively, in these examples. A bladder is an elongate inflatable device used to apply a substantially uniform force or pressure to the prepreg assembly during forming. The bladder applies this force such that the prepreg assembly conforms to the shape of the surface of tool 406.

In this illustrative example, channel 418 is formed within moveable beam 518 and moveable beam 522 in positioning section 410 of frame 402. As depicted, section 528 includes heating system 426 and force application system 428 for shaping system 404.

Figure 6:
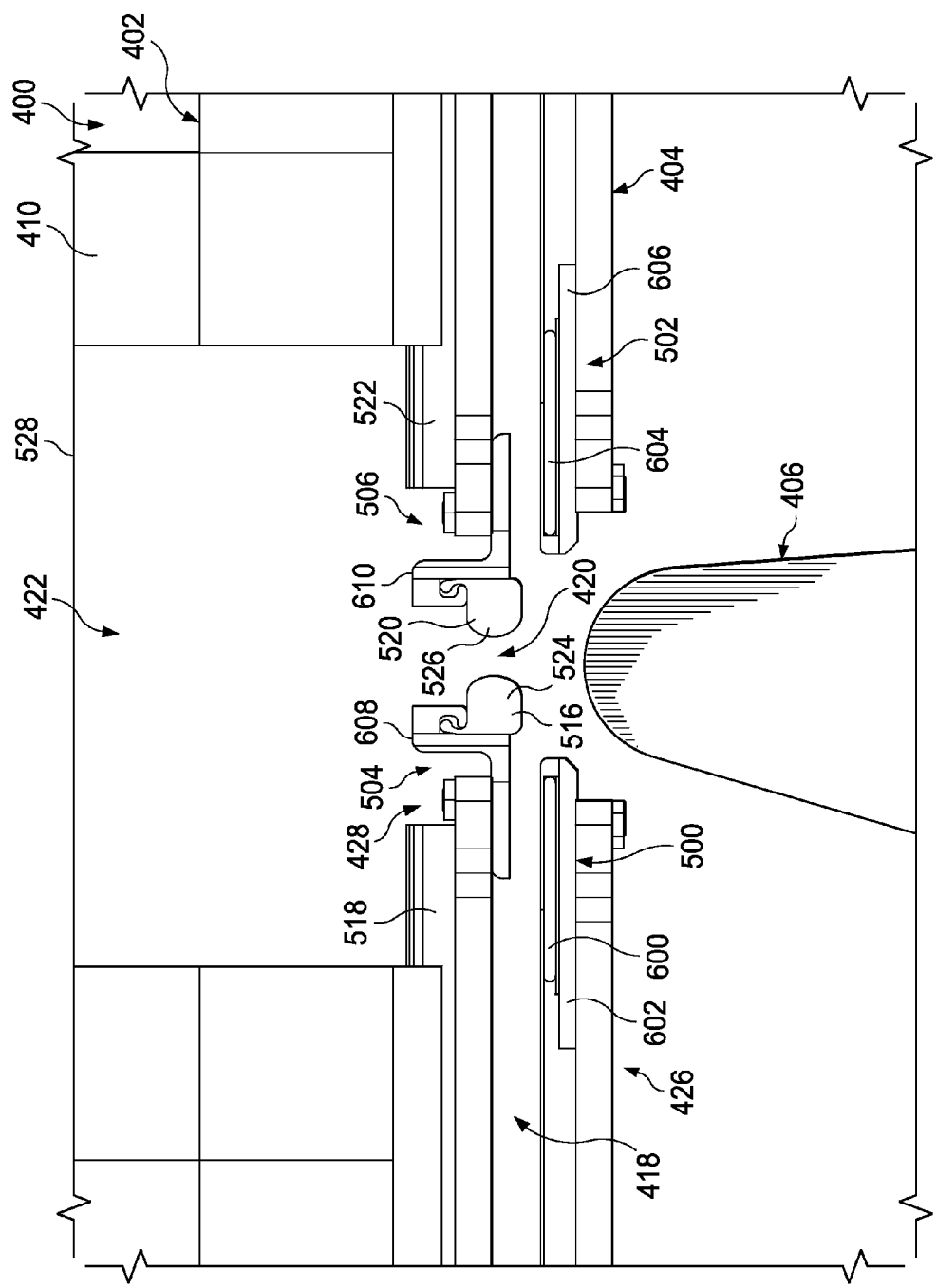
FIG. 6 is an illustration of a side view of a portion of an airfoil forming system in accordance with an advantageous embodiment.

With reference now to FIG. 6, an illustration of a side view of a portion of an airfoil forming system is depicted in accordance with an advantageous embodiment. In this illustrative example, a more detailed illustration of section 528 in FIG. 5 is depicted in accordance with an advantageous embodiment.

In this example, first heating assembly 500 comprises heater 600 and heater support plate 602. Second heating assembly 502 comprises heater 604 and heater support plate 606. In this illustrative example, bladder 524 is connected to moveable beam 518 by bearing beam 608. Bladder 526 is connected to moveable beam 522 by bearing beam 610.

As depicted, heater support plate 602 is connected to moveable beam 518. Heater support plate 606 is connected to moveable beam 522.

Figure 7:
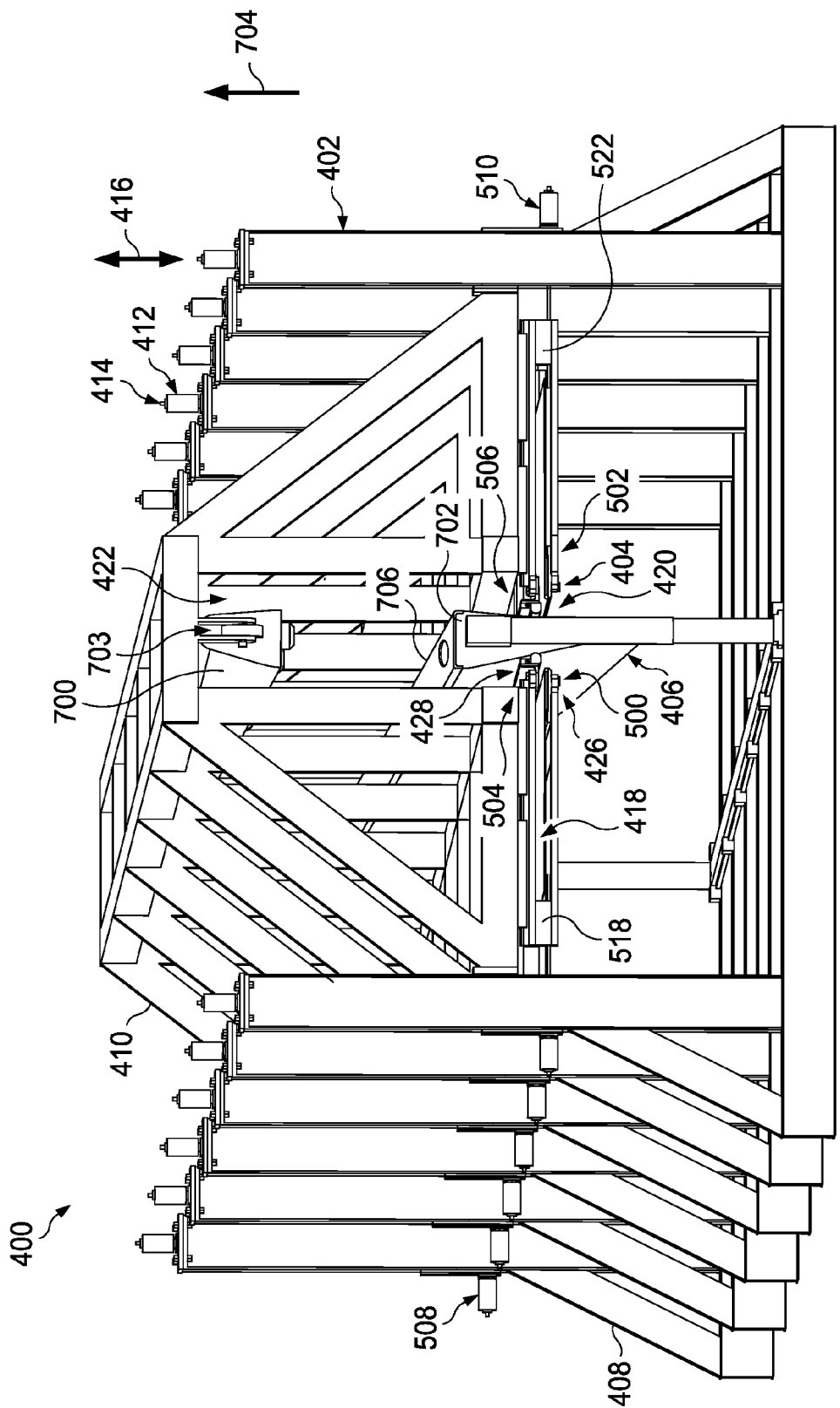
FIG. 7 is an illustration of an airfoil forming system with a multipart tool in accordance with an advantageous embodiment.

With reference now to FIGS. 7-14, illustrations of a process for forming an airfoil are depicted in accordance with an advantageous embodiment. In FIG. 7, an illustration of an airfoil forming system with a multipart tool is depicted in accordance with an advantageous embodiment.

As depicted, tool 406 comprises two parts in these examples, mandrel 700 and mandrel 702. Mandrel 700 is connected to positioning section 410, while mandrel 702 is connected to base 408. In particular, mandrel 702 is connected to positioning section 410 through connection system 703 of positioning section 410.

Connection system 703 may comprise, for example, a number of structural members attached to positioning section 410, a number of pins configured to connect the number of structural members to mandrel 700, and/or other suitable components. Of course, in other illustrative examples, connection system 703 may comprise any number of components configured to connect mandrel 700 to positioning section 410.

In this illustrative example, positioning section 410 is moved downwards in the direction of axis 416 into a position such that mandrel 700 can be connected to connection system 703. Then, positioning section 410 is moved upwards in the direction of axis 416 to move mandrel 700 relative to mandrel 702. In other words, positioning section 410 moves such that mandrel 700 may be moved away from mandrel 702 to allow a prepreg assembly to be positioned relative to top 706 of mandrel 702.

Positioning section 410 moves in the direction of arrow 704 relative to base 408 until the heater support plates in first heating assembly 500 and second heating assembly 502 are substantially planar with top 706 of mandrel 702. Top 706 of mandrel 702 is a location for a prepreg assembly used to form a spar in the airfoil.

Figure 8:
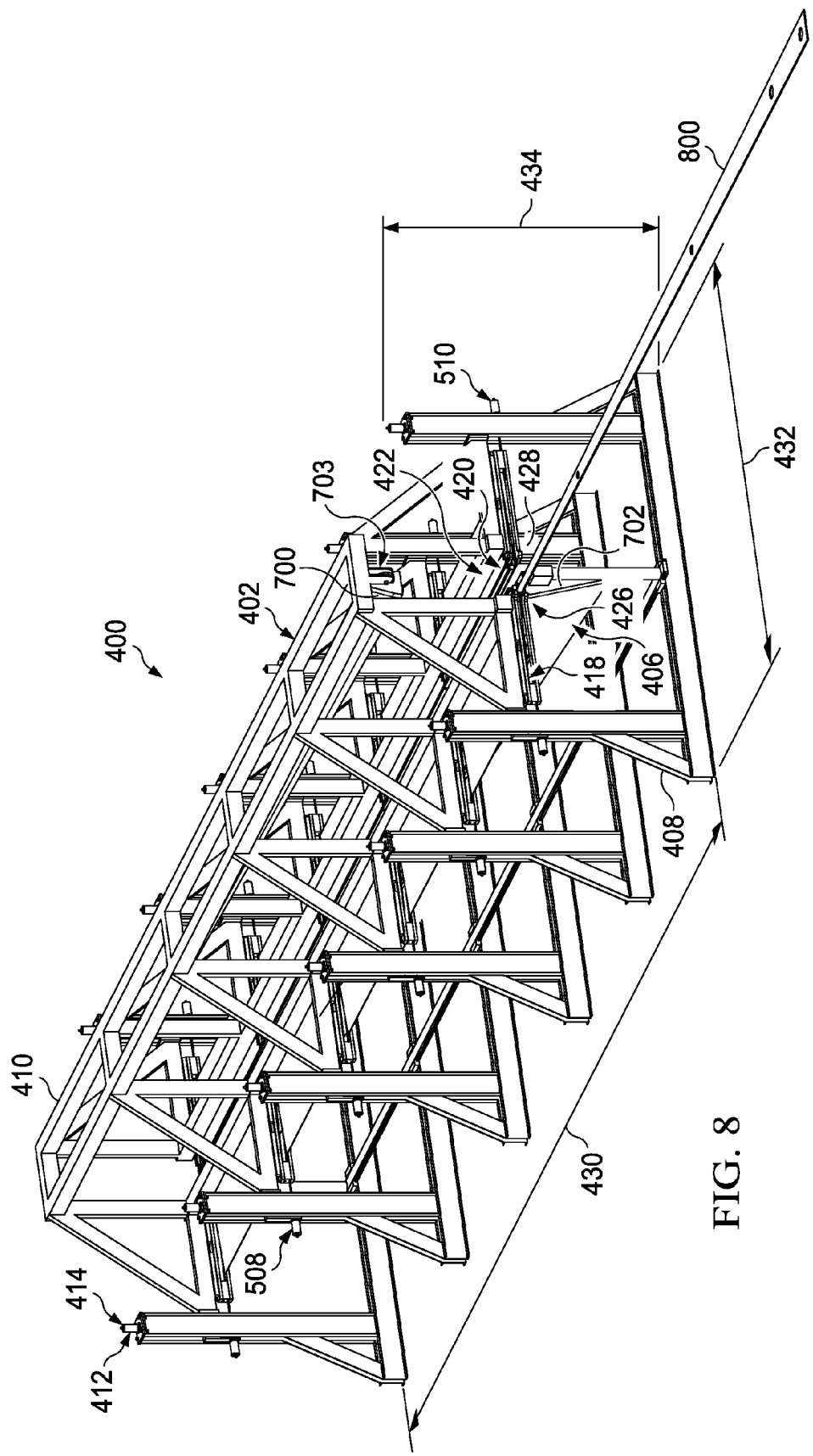
FIG. 8 is an illustration of a perspective view of an airfoil forming system with a prepreg assembly being inserted in accordance with an advantageous embodiment.

With reference now to FIG. 8, an illustration of a perspective view of an airfoil forming system with a prepreg assembly being inserted is depicted in accordance with an advantageous embodiment. In this illustration, prepreg assembly 800 is loaded into channel 418. Prepreg assembly 800 may be loaded into channel 418 in a number of different ways. For example, prepreg assembly 800 may be loaded by human operators, a robot, a combination of the two, or some other suitable system.

Figure 9:
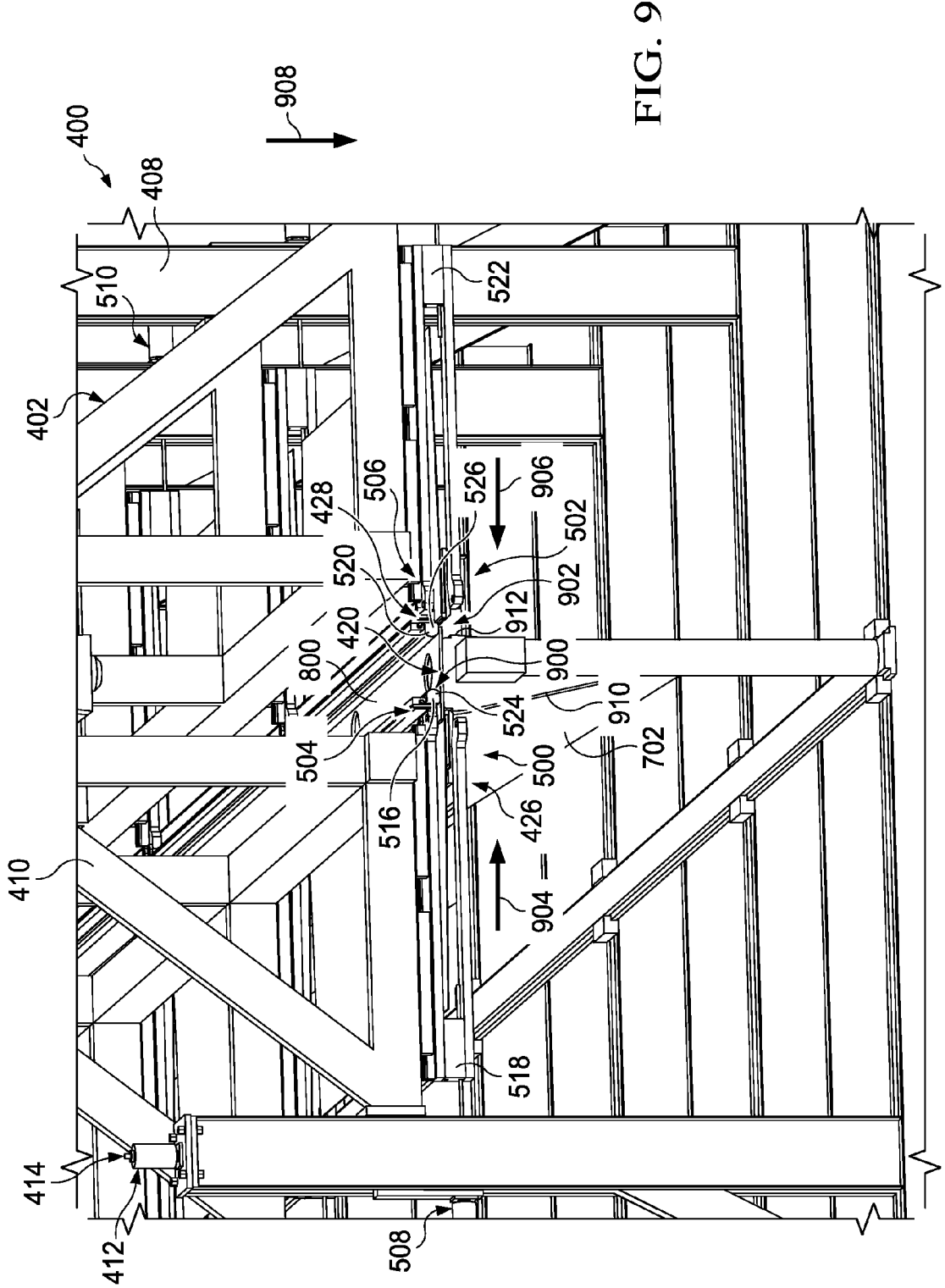
FIG. 9 is an illustration of a portion of an airfoil forming system used to form a spar in the airfoil in accordance with an advantageous embodiment.

With reference now to FIG. 9, an illustration of a portion of an airfoil forming system used to form a spar in the airfoil is depicted in accordance with an advantageous embodiment. In this illustrative example, prepreg assembly 800 is heated such that section 900 and section 902 form heated sections that may be changed in shape to form a shape for the airfoil. In this example, the shape is the shape of a spar for the airfoil.

First movement system 508 and second movement system 510 move moveable beams 518 and 522 to position bladder 524 and bladder 526 relative to section 900 and section 902 of prepreg assembly 800. In these examples, bladder 524 is moved in the direction of arrow 904, and bladder 526 is moved in the direction of arrow 906.

Additionally, movement system 412 moves positioning section 410 in the direction of arrow 908.

These movements cause bladder 524 and bladder 526 to apply a force to section 900 and section 902 of prepreg assembly 800 to change prepreg assembly 800 from its original shape into a shape for a spar of the airfoil. Bladder 524 applies force against section 900 to push section 900 against side 910 of mandrel 702. Bladder 526 moves to apply force against section 902 to move section 902 against side 912 of mandrel 702.

Figure 10:
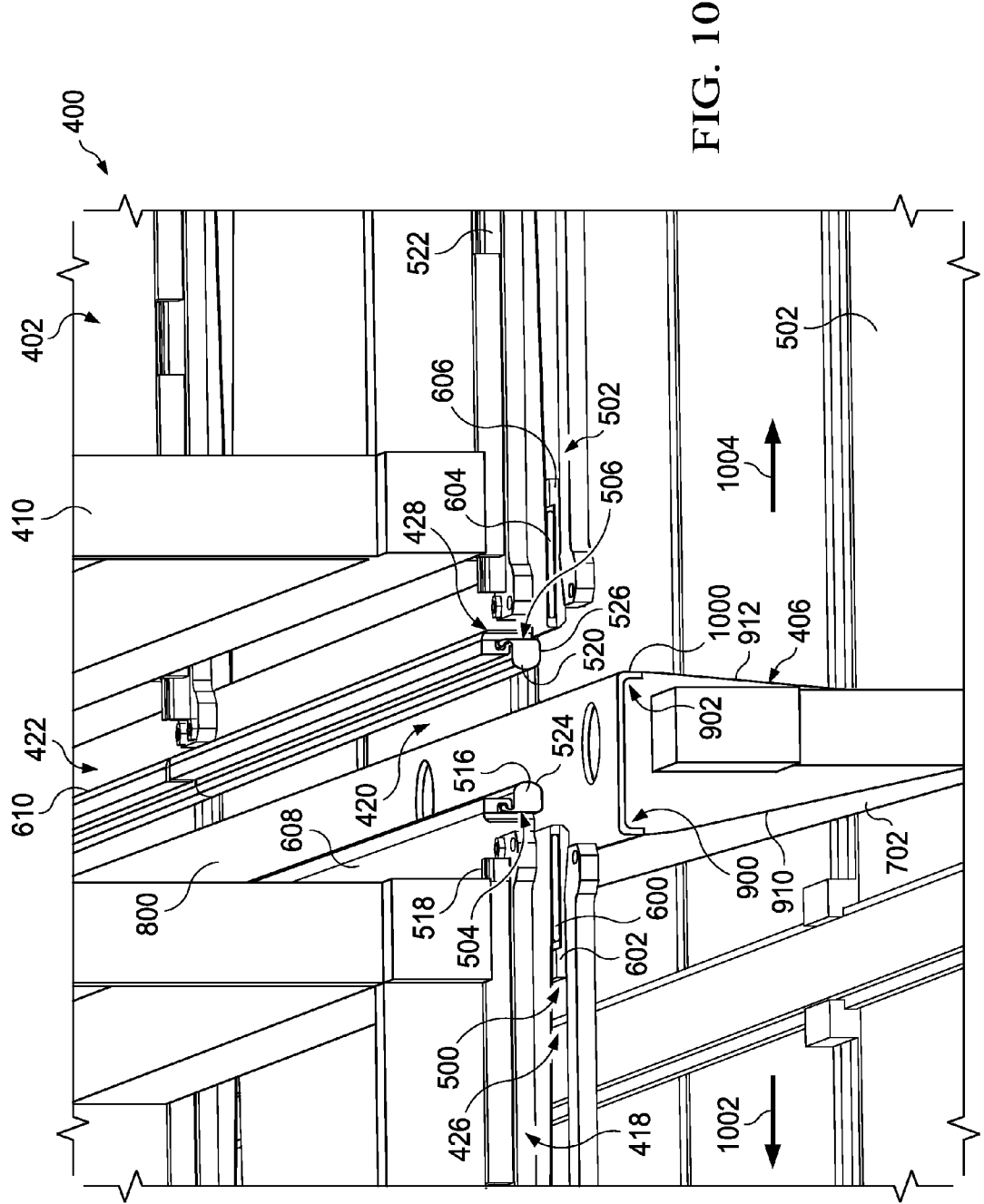
FIG. 10 is an illustration of a portion of an airfoil forming system with a formed prepreg assembly in a shape of a spar in accordance with an advantageous embodiment.

With reference now to FIG. 10, an illustration of a portion of an airfoil forming system with a formed prepreg assembly in a shape of a spar is depicted in accordance with an advantageous embodiment. In this example, prepreg assembly 800 has been changed in shape to the shape of spar 1000 for the airfoil.

First movement system 508 and second movement system 510 from FIG. 5 move moveable beam 518 and moveable beam 522 in the direction of arrows 1002 and 1004, respectively. This movement moves bladder 524 and bladder 526 away from prepreg assembly 800. Additionally, heater 600 and heater 604 may be turned off to allow prepreg assembly 800 to cool.

Figure 11:
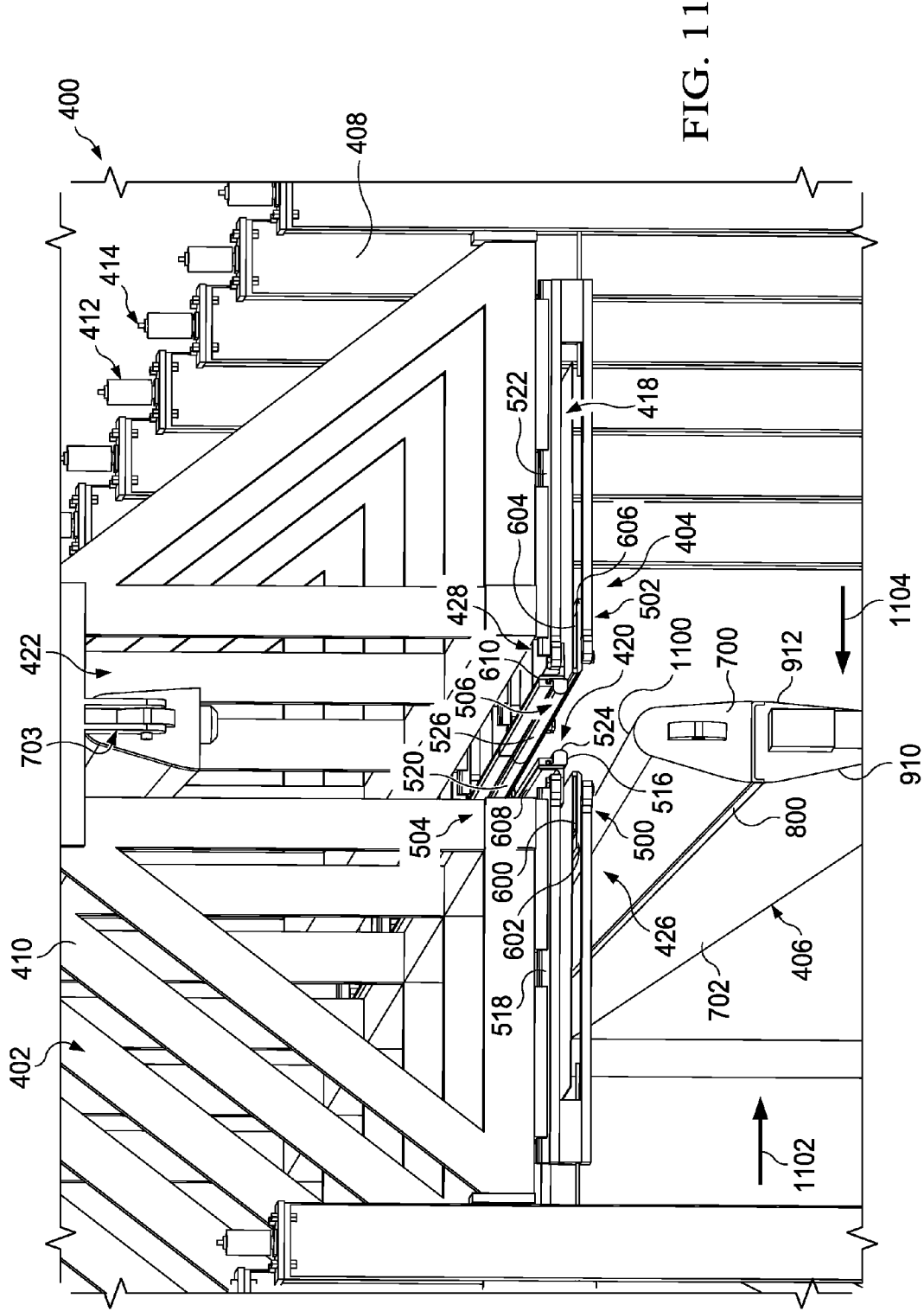
FIG. 11 is an illustration of a portion of an airfoil forming system being positioned to form a shell for a blade in accordance with an advantageous embodiment.

With reference now to FIG. 11, an illustration of a portion of an airfoil forming system being positioned to form a shell for a blade is depicted in accordance with an advantageous embodiment. Positioning section 410 has moved to place mandrel 700 on top of mandrel 702 in this example. Mandrel 700 may be connected to mandrel 702 in these examples. After this movement, prepreg assembly 800 is now located between mandrel 700 and mandrel 702. Movement system 412 moves positioning section 410 such that heater support plates are substantially level or matched to top 1100 of mandrel 700. Moveable beam 518 and moveable beam 522 may be moved in the direction of arrows 1102 and 1104 until they touch mandrel 700.

Figure 12:
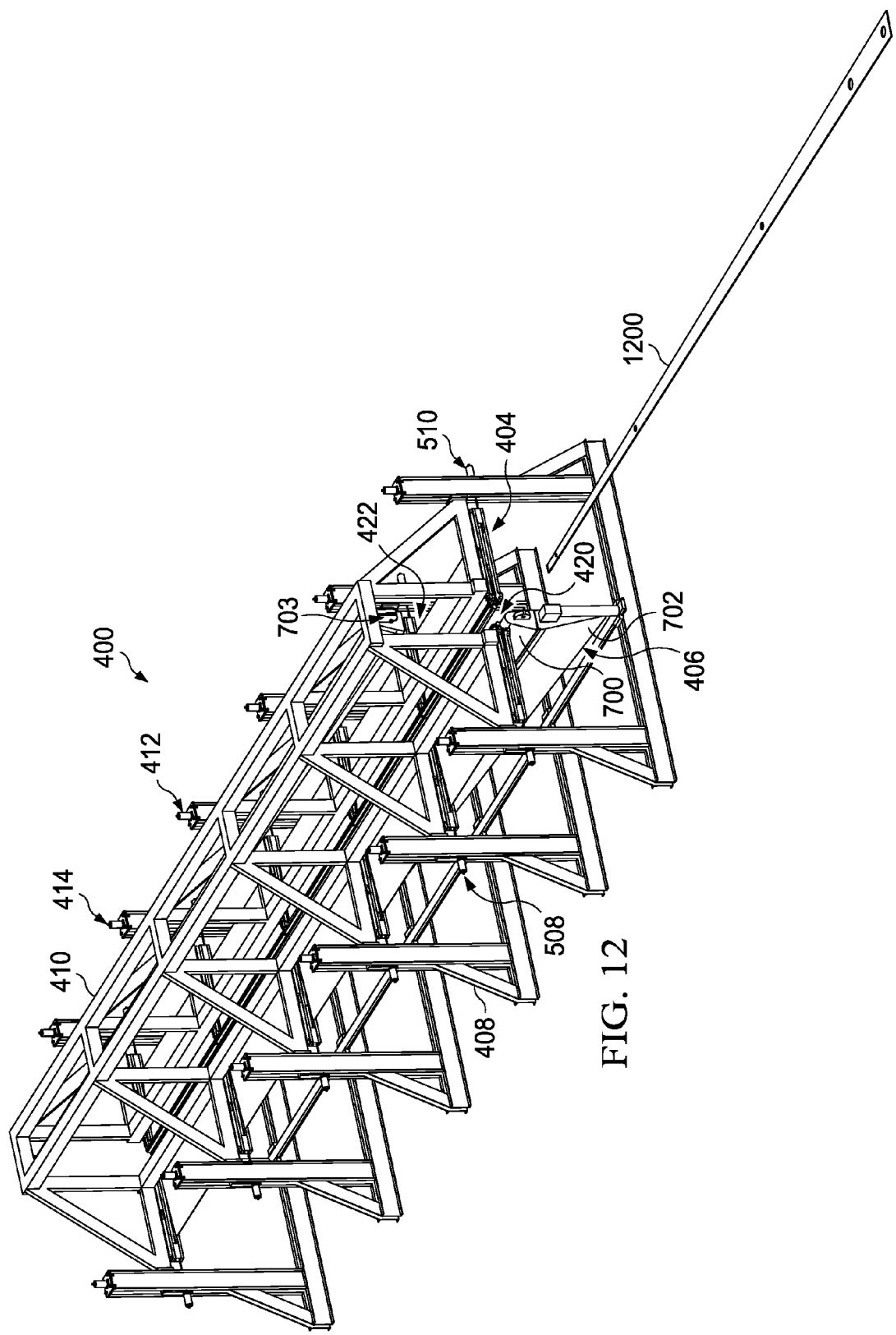
FIG. 12 is an illustration of an airfoil forming system with a prepreg assembly for a shell of a blade being inserted in accordance with an advantageous embodiment.

With reference now to FIG. 12, an illustration of an airfoil forming system with a prepreg assembly for a shell of a blade being inserted is depicted in accordance with an advantageous embodiment. Prepreg assembly 1200 is then placed into channel 418. First heating assembly 500 and second heating assembly 502 may heat sections of prepreg assembly 1200.

Figure 13:
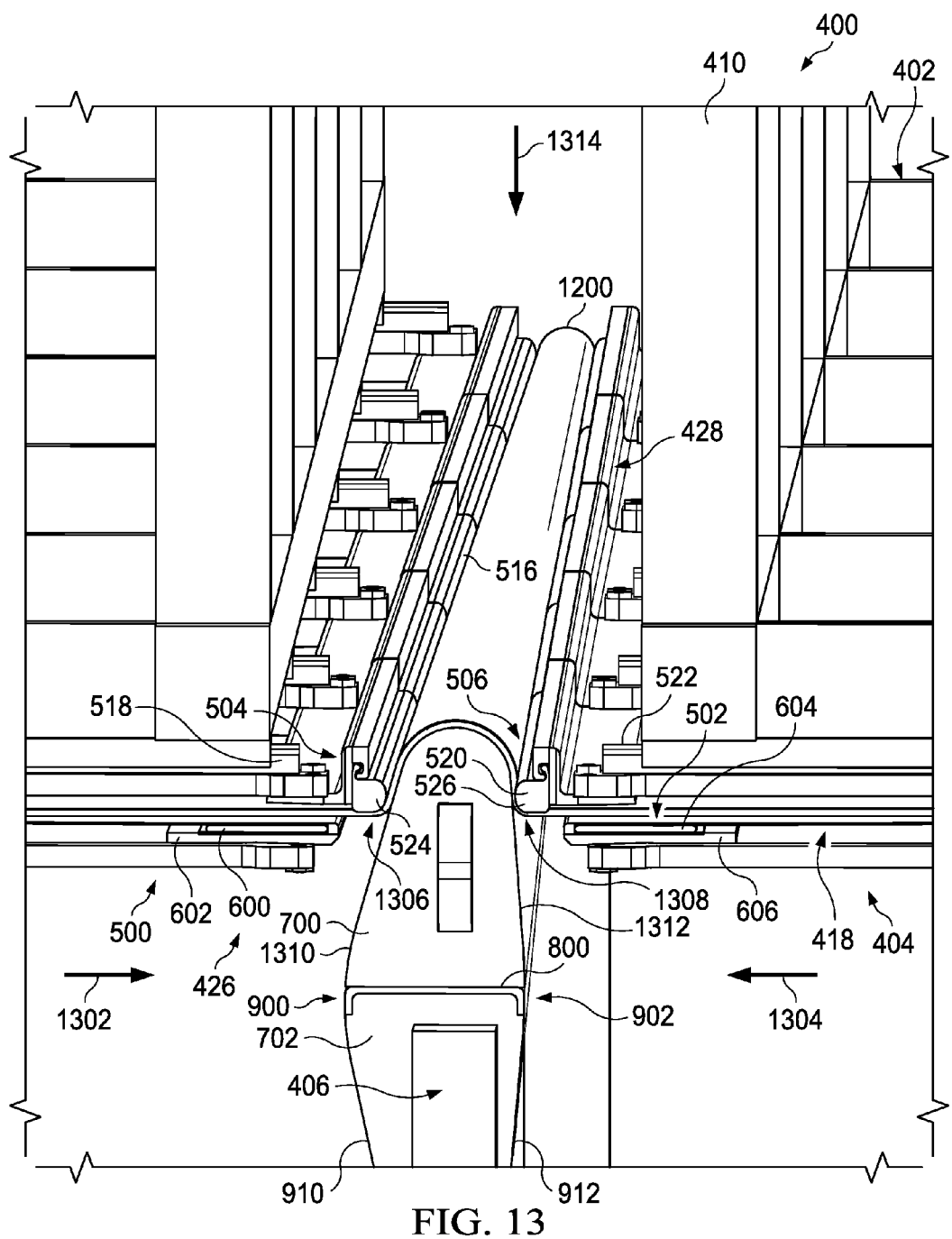
FIG. 13 is an illustration of an airfoil forming system with a partially formed prepreg assembly in accordance with an advantageous embodiment.

With reference now to FIG. 13, an illustration of an airfoil forming system with a partially formed prepreg assembly is depicted in accordance with an advantageous embodiment. Moveable beam 518 and moveable beam 522 are moved in the direction of arrows 1302 and 1304 such that bladder 524 and bladder 526 apply a force against section 1306 and section 1308 of prepreg assembly 1200. In these illustrative examples, section 1306 and section 1308 are heated sections of prepreg assembly 1200. Bladder 524 and bladder 526 press section 1306 and section 1308 against sides 1310 and 1312 of mandrel 700, respectively.

Additionally, the force applied to section 1306 and section 1308 by bladder 524 and bladder 526 against side 1310 and side 1312, respectively, combined with the bending force applied by first heating assembly 500 and second heating assembly 502, provides a tension force on prepreg assembly 1200 in a manner that may prevent wrinkles from forming within individual plies in prepreg assembly 1200. Positioning section 410 moves in the direction of arrow 1314 in this example.

Figure 14:
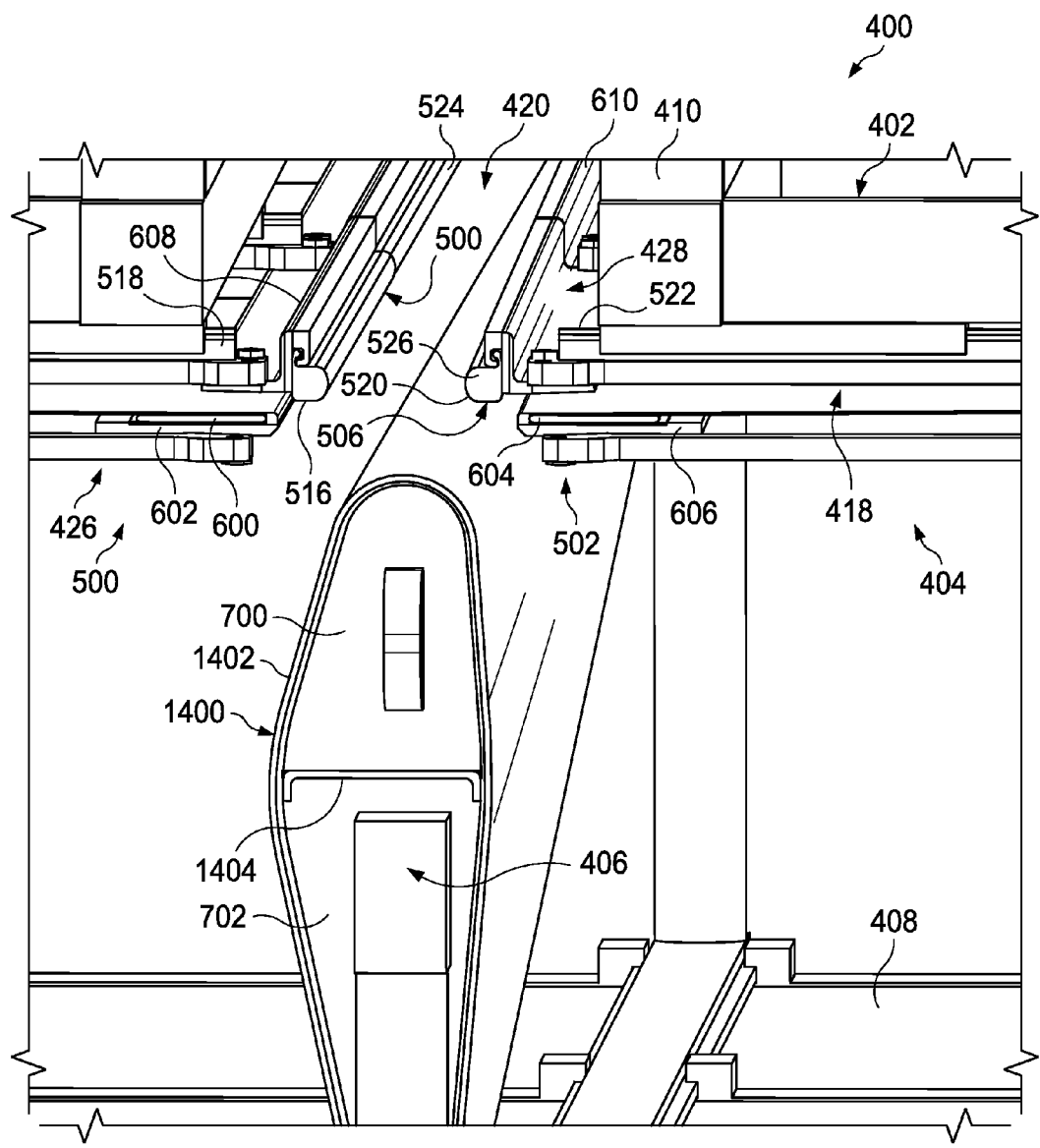
FIG. 14 is an illustration of a portion of an airfoil forming system with a completed blade in accordance with an advantageous embodiment.

With reference now to FIG. 14, an illustration of a portion of an airfoil forming system with a completed blade depicted in accordance with an advantageous embodiment. Prepreg assembly 800 in FIG. 8 and prepreg assembly 1200 in FIG. 12 have been changed from their original shape into shapes for airfoil 1400. As can be seen, prepreg assembly 1200 forms outer shell 1402 for airfoil 1400. Prepreg assembly 800 forms spar 1404 for airfoil 1400. At this point, airfoil 1400, mandrel 700, and mandrel 702 may be moved to a location for curing airfoil 1400. After curing, mandrel 700 and mandrel 702 may be removed.

Figure 15:
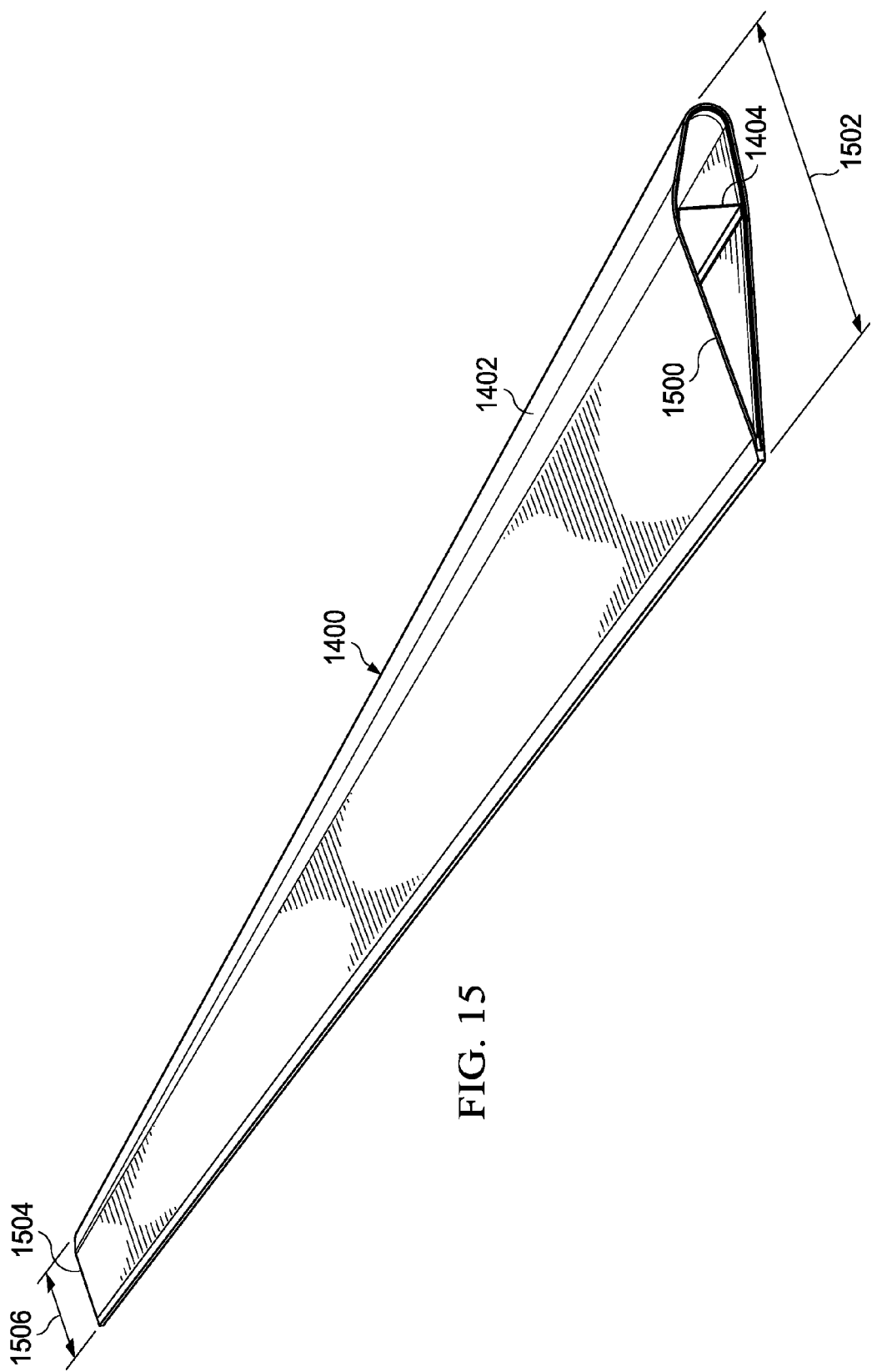
FIG. 15 is an illustration of a perspective view of an airfoil in accordance with an advantageous embodiment.

With reference now to FIG. 15, an illustration of a perspective view of an airfoil is depicted in accordance with an advantageous embodiment. As can be seen, side 1500 of airfoil 1400 has length 1502, while side 1504 of airfoil 1400 has length 1506. Length 1502 is greater than length 1506 in this illustrative example.

Figure 16:
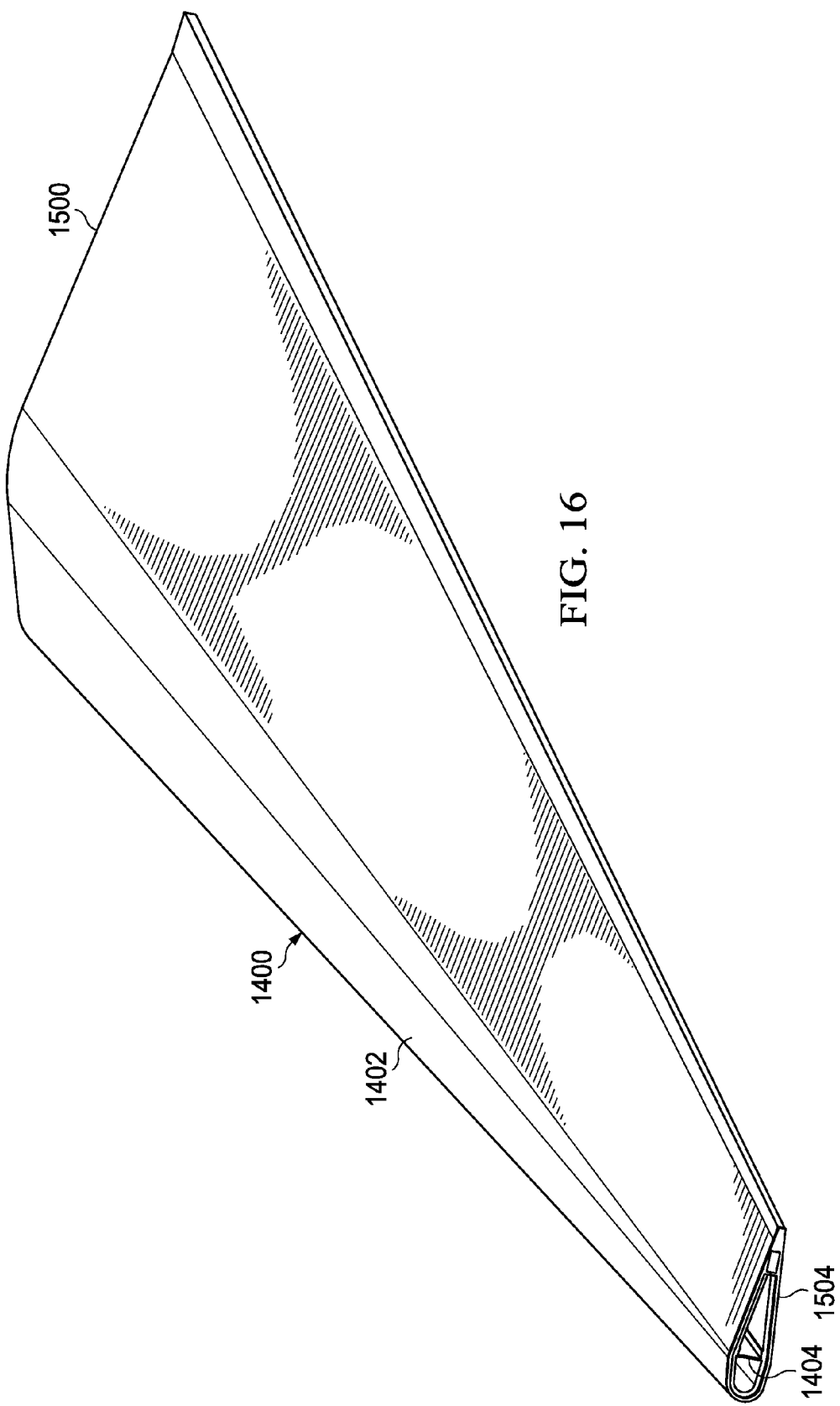
FIG. 16 is another illustration of a perspective view of an airfoil in accordance with an advantageous embodiment.
Figure 17:
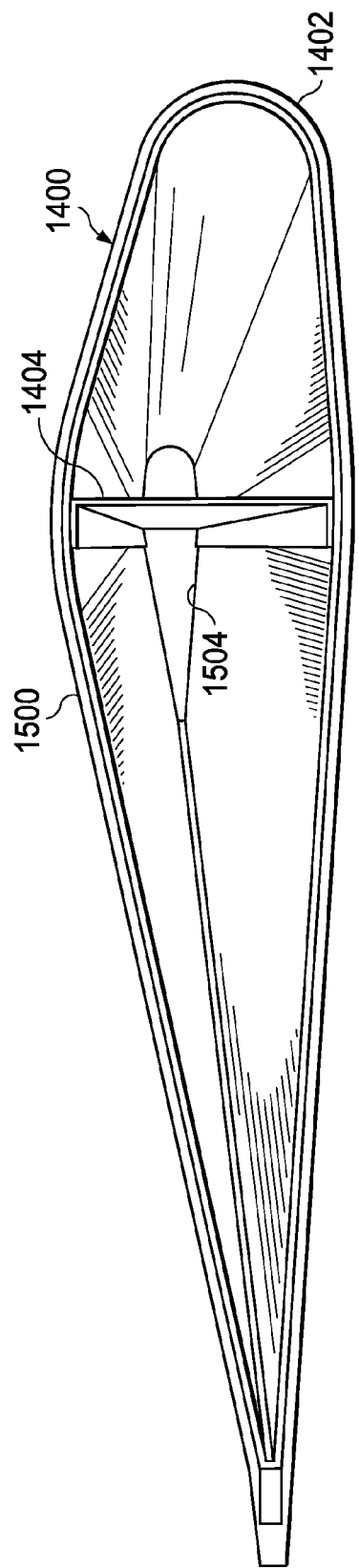
FIG. 17 is an illustration of a side view of an airfoil in accordance with an advantageous embodiment.

With reference now to FIG. 16, another illustration of a perspective view of an airfoil is depicted in accordance with an advantageous embodiment. Further, in FIG. 17, an illustration of a side view of an airfoil is depicted in accordance with an advantageous embodiment.

Figure 18:
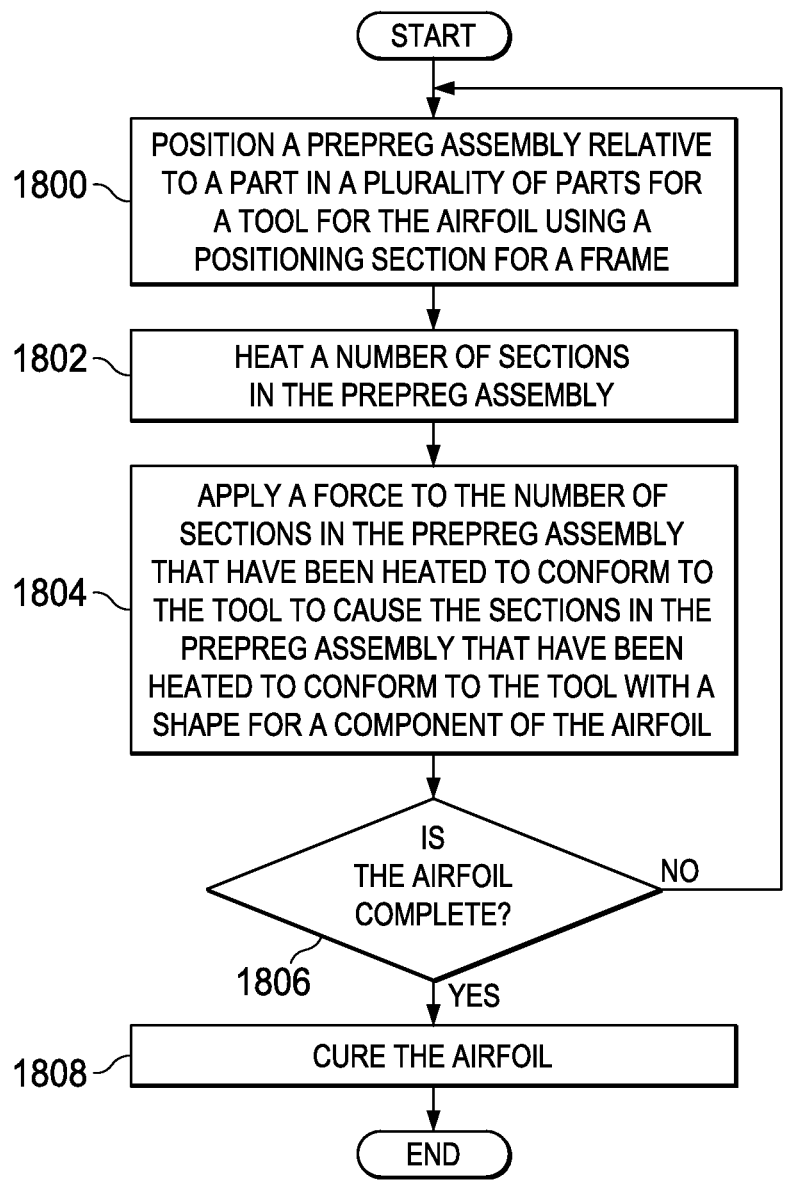
FIG. 18 is an illustration of a flowchart of a process for shaping an airfoil in accordance with an advantageous embodiment.

Turning now to FIG. 18, an illustration of a flowchart of a process for shaping an airfoil is depicted in accordance with an advantageous embodiment. The process illustrated in FIG. 18 may be implemented using airfoil forming system 308 in FIG. 3. In particular, this process may be implemented to form an airfoil and/or a component of an airfoil having a second shape from a prepreg assembly having a first shape.

The process begins by positioning a prepreg assembly relative to a part in a plurality of parts for a tool for the airfoil using a positioning section for a frame (operation 1800). The positioning section is configured to move relative to the tool and a base of the frame and move a number of parts in the plurality of parts for the tool relative to each other. The plurality of parts may be, for example, a plurality of mandrels.

The process then heats a number of sections in the prepreg assembly (operation 1802). In operation 1802, the number of sections is heated using a heating system in a shape forming system for the airfoil forming system. The heating system heats the number of sections in the prepreg assembly to a temperature sufficient to allow the number of sections to be pliable and able to conform to the tool.

Thereafter, the process applies a force to the number of sections in the prepreg assembly that have been heated to conform to the tool to cause the sections in the prepreg assembly that have been heated to conform to the tool with a shape for a component of the airfoil (operation 1804). Thereafter, the process determines whether the airfoil is complete (operation 1806). The airfoil is complete when the prepreg assembly has been shaped into the second shape for the airfoil. In some illustrative examples, the airfoil is complete when a number of prepreg assemblies have been shaped into shapes for different components of the airfoil.

If the airfoil is complete, the process cures the airfoil (operation 1808), with the process terminating thereafter. Otherwise, the process returns to operation 1800 as described above. In repeating operation 1800, the operation will be performed using an additional prepreg assembly. The first time operation 1800 is performed, the part is a first part. The prepreg assembly having the second shape for the airfoil is stuck to the first part of the tool on which the prepreg assembly is formed and is left on the part. In repeating operation 1800, the additional prepreg assembly is positioned relative to a second part in the plurality of parts for the tool with the prepreg assembly still on the first part.

With reference now to FIG. 19, an illustration of a flowchart of a process for shaping an airfoil is depicted in accordance with an advantageous embodiment. The process illustrated in FIG. 19 may be implemented using airfoil forming system 308 in FIG. 3. In particular, this process may be implemented to form an airfoil comprising a number of components.

The process begins by selecting a prepreg assembly for an unformed component in a number of components for an airfoil (operation 1900). The component may be, for example, a spar or a shell for the airfoil. The prepreg assembly is then placed into a channel of a shaping system for the airfoil forming system (operation 1901). The airfoil forming system comprises the shaping system and a frame. The frame comprises a base and a positioning section. The positioning section is configured to move relative to the base in the direction of a vertical axis.

In this illustrative example, the positioning section is associated with the shaping system. The channel in the shaping system has a gap having a first side and a second side. The portion of the prepreg assembly within the gap is exposed to a channel formed within the positioning section. The channel within the positioning section is substantially perpendicular to the channel in the shaping system.

The prepreg assembly is then positioned relative to a mandrel for a tool using the frame (operation 1902). The mandrel is one of a plurality of mandrels for the tool in this illustrative example. In operation 1902, the positioning section moves downwards to position the prepreg assembly relative to the mandrel. In particular, the first time this operation is performed, the prepreg assembly is positioned on the top of the mandrel. In this illustrative example, the top portion of the mandrel has a shape for the spar of an airfoil. The tool may comprise any number of mandrels in this illustrative example.

Thereafter, a first section and a second section of the prepreg assembly are heated using a heating system in the shaping system (operation 1904). The first section of the prepreg assembly is exposed to the heating system at the first side of the gap in the channel in the shaping system. The second section of the prepreg assembly is exposed to the heating system at the second side of the gap in the channel in the shaping system.

The heating system comprises a first heating assembly and a second heating assembly. The first heating assembly is configured to heat the first section of the prepreg assembly, and the second heating assembly is configured to heat the second section of the prepreg assembly.

Next, a first force application assembly and a second force application assembly are moved using a first movement system and a second movement system, respectively, to apply a force to the first section and second section, respectively, of the prepreg assembly (operation 1906). The first force application assembly and the second force application assembly are part of a force application system in the shaping system.

In operation 1906, the force is applied such that the first section conforms to a first side of the mandrel and the second section conforms to a second side of the mandrel. Further, the first force application assembly and the second force application assembly are moved in opposite directions.

A determination is made as to whether a prepreg assembly has been formed such that the prepreg assembly has the shape for the component (operation 1908). When the shape of the prepreg assembly has the shape of the particular component, the component is complete. If the prepreg assembly does not have the shape for the component, the process returns to operation 1906 as described above.

In repeating operation 1906, the positioning section moves downwards such that a new first section and a new second section of the new prepreg assembly is exposed in the gap in the channel of the shaping system. In this manner, the channel in the positioning section moves down over the tool.

With reference again to operation 1908, if the prepreg assembly has the shape for the component, the positioning section of the frame is moved upwards relative to the base of the frame such that the particular component is left on the mandrel (operation 1910). Thereafter, a determination is made as to whether the airfoil is complete (operation 1912).

If the airfoil is complete, the process then cures the airfoil (operation 1914), with the process terminating thereafter. If the airfoil is not complete, the positioning section is moved to place a new mandrel on top of the current mandrel (operation 1916). The current mandrel is the mandrel on which the prepreg assembly was shaped. The new mandrel is connected to the positioning section during the shaping of the prepreg assembly.

In operation 1916, the movement of the positioning section moves the new mandrel downwards and on top of the current mandrel. Further, in operation 1916, the new mandrel is placed on top of the current mandrel by disconnecting the new mandrel from the positioning section such that the new mandrel is left on top of the current mandrel when the positioning section moves upwards.

Thereafter, the process returns to operation 1900 as described above.

Although these examples illustrate the use of a tool with two mandrels, other examples may have other numbers of mandrels. For example, other implementations may use three or four mandrels that may be placed on top of each other. Further, these mandrels also may be connected to each other or may have shapes that allow alignment of the mandrels to each other.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

In this manner, the different advantageous embodiments provide a method and apparatus for forming airfoils. In one advantageous embodiment, an apparatus comprises a frame and a forming system. The frame is configured to hold a prepreg assembly relative to a tool. The forming system is associated with the frame and configured to move the prepreg assembly relative to the tool to change a first shape of the prepreg assembly to form a second shape for an airfoil.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a tool having a plurality of parts;
   a frame comprising a base and a positioning system, the positioning system configured to position a prepreg assembly relative to the tool, move relative to the tool and the base of the frame, and move a part in the plurality of parts relative to other parts in the plurality of parts during shaping of the prepreg assembly; and
   a shaping system associated with the frame and configured to move relative to the prepreg assembly, the prepreg assembly positioned relative to a number of parts in the plurality of parts for the tool connected to the base, to change a first shape of the prepreg assembly to form a second shape for an airfoil when the positioning section moves relative to the tool.

2. The apparatus of claim 1, wherein the shaping system comprises:
   a heating system configured to heat a number of sections in the prepreg assembly to form a number of heated sections in the prepreg assembly; and
   a force application system configured to apply a force to the number of heated sections in the prepreg assembly relative to the tool such that the number of heated sections in the prepreg assembly has the second shape for the airfoil.

3. The apparatus of claim 2, wherein the positioning section is configured to move the prepreg assembly such that additional sections in the prepreg assembly are heated to form additional heated sections of the prepreg assembly and the force is applied to the additional sections in the prepreg until the prepreg assembly has the second shape for the airfoil.

4. The apparatus of claim 2, wherein the second shape is selected from one of a spar and a shell for the airfoil.

5. The apparatus of claim 2, wherein the positioning section is configured to position a number of additional prepreg assemblies relative to the number of parts in the plurality of parts for the tool connected to the base and the shaping system is configured to move the number of additional prepreg assemblies relative to the number of parts in the plurality of parts for the tool until the airfoil is formed.

6. The apparatus of claim 2 further comprising:
   a first channel in the shaping system in which the first channel has a gap, wherein the heating system is configured to heat the number of sections in the prepreg assembly located in the first channel to form the number of heated sections and wherein the number of heated sections in the prepreg assembly is located in the gap in a position relative to the tool.

7. The apparatus of claim 1, wherein the positioning section comprises:
   a second channel in the positioning section configured to receive the part of the tool when moving the part of the tool relative to the other parts of the tool.

8. The apparatus of claim 6, wherein the gap has a first side and a second side and wherein the heating system comprises:
   a first heating assembly located on the first side of the gap; and
   a second heating assembly located on the second side of the gap, wherein the first heating assembly and the second heating assembly are each configured to heat a section in the number of sections of the prepreg assembly.

9. The apparatus of claim 8, wherein the force application system comprises:
   a first force application assembly associated with the frame on the first side of the gap; and
   a second force application assembly associated with the frame on the second side of the gap, wherein the first force application assembly and the second force application assembly are configured to move to apply the force to the number of heated sections in the prepreg assembly relative to the number of parts in the plurality of parts for the tool connected to the base such that the number of heated sections in the prepreg assembly has the second shape for the airfoil.

10. The apparatus of claim 9, wherein movement of the first force application assembly and the second force application assembly changes a size of the gap.

11. The apparatus of claim 9, wherein the first force application assembly comprises:
a first number of elongate members; and
a first movement system configured to move the first number of elongate members relative to the tool to apply the force to the number of heated sections in the prepreg assembly; and
wherein the second force application assembly comprises:
a second number of elongate members; and
a second movement system configured to move the second number of elongate members relative to the number of parts for the tool connected to the base to apply the force to the number of heated sections in the prepreg assembly.

12. The apparatus of claim 11, wherein the first number of elongate members and the second number of elongate members are a plurality of bladders.

13. The apparatus of claim 11, wherein the first movement system comprises a first number of actuators; the second movement system comprises a second number of actuators; the first number of actuators is configured to move a portion of the first number of elongate members independently from another portion of the first number of elongate members; and the second number of actuators is configured to move a portion of the second number of elongate members independently from another portion of the second number of elongate members.

14. The apparatus of claim 1, wherein the plurality of parts have a plurality of shapes such that a plurality of prepreg assemblies can be formed to have the plurality of shapes using the plurality of parts and wherein the positioning section is configured to move each part in the plurality of parts relative to the other parts in the plurality of parts for the tool such that each prepreg assembly in the plurality of prepreg assemblies can be positioned relative to a corresponding part in the plurality of parts.

15. The apparatus of claim 1, wherein the tool is selected from one of an outer mold line, a number of mandrels, and a two-piece mold.

16. The apparatus of claim 1, wherein the airfoil is selected from one of a blade for a wind turbine, the blade for an aircraft, and a wing of an aircraft.

17. An airfoil forming system comprising:
a tool comprising a plurality of parts;
a frame having a base and a positioning section, wherein the positioning section has a first channel and is configured to position a prepreg assembly in the first channel relative to the tool; move relative to the tool and the base of the frame; and move a part in the plurality of parts relative to other parts in the plurality of parts; and
a shaping system comprising a heating system, a force application system, and a second channel, wherein the heating system is associated with the positioning section and is configured to heat a number of sections in the prepreg assembly to form a number of heated sections in the prepreg assembly and wherein the force application system is associated with the positioning section and is configured to apply a force to the number of heated sections in the prepreg assembly relative to the tool such that the number of heated sections in the prepreg assembly has a second shape for the airfoil.

* * * * *